United States Patent
Hamza et al.

(10) Patent No.: US 12,135,730 B2
(45) Date of Patent: Nov. 5, 2024

(54) APPARATUSES, COMPUTER PROGRAM PRODUCTS, AND COMPUTER-IMPLEMENTED METHODS FOR INTEGRATING THIRD-PARTY DEVICES

(71) Applicant: Honeywell International Inc., Charlotte, NC (US)

(72) Inventors: Mohammad Ameer Hamza, Bangalore (IN); Roshan Lawrence Valder, Atlanta, GA (US); Saurabh Bhattacharya, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 63 days.

(21) Appl. No.: 18/176,898

(22) Filed: Mar. 1, 2023

(65) Prior Publication Data

US 2024/0296167 A1 Sep. 5, 2024

(51) Int. Cl.
*G06F 16/00* (2019.01)
*G06F 16/21* (2019.01)
*G06F 16/25* (2019.01)

(52) U.S. Cl.
CPC .......... *G06F 16/252* (2019.01); *G06F 16/211* (2019.01)

(58) Field of Classification Search
CPC .............................. G06F 16/252; G06F 16/211
See application file for complete search history.

(56) References Cited

U.S. PATENT DOCUMENTS

| | | | |
|---|---|---|---|
| 6,449,644 B1 * | 9/2002 | Håål et al. | H04L 9/40 709/202 |
| 2022/0147702 A1 * | 5/2022 | Li | G06N 3/088 |

OTHER PUBLICATIONS

Genesereth et al., "Infomaster: An Information Integration System," 1997, ACM, pp. 539-542. (Year: 1997).*

* cited by examiner

*Primary Examiner* — Cheryl Lewis
(74) *Attorney, Agent, or Firm* — Alston & Bird LLP

(57) ABSTRACT

Embodiments of the disclosure provide for improved integration of third-party devices in a system. Specifically, embodiments provide for improved integration management, including creation, deployment, maintenance, and monitoring of integrations utilizing integration templates. Embodiments include operation using a specially configured templating system that enables creation of integration template(s), management of integration template(s), searching of integration template(s), and initiation of such integration template(s) into integration instance(s) for particular client system(s), as well as updating of integration instance(s) based on integration template(s). Some embodiments provide dashboard(s) for accessing and/or managing integration instance(s) or associated information. Some example embodiments receive template information of source schema data, target schema data, and template transformation data, generate an integration template based at least in part on the template information, enable a client system to access at least the integration template via the templating system, and initiate an integration instance based on the integration template.

19 Claims, 21 Drawing Sheets

FIG. 16

TRANSFORMATION INTEGRATION 31
Activity Log

| USER | TIMESTAMP | ACTIVITY |
|---|---|---|
| USER 1 | 11:54:33 22/01/2022 | Updated integration template |
| USER 2 | 11:54:33 22/01/2022 | Updated instance description, template schema |
| USER 1 | 11:54:33 22/01/2022 | Updated Parameters |
| USER 1 | 11:54:33 22/01/2022 | Updated Parameters |
| USER 1 | 11:54:33 22/01/2022 | Updated instance description, template schema |
| USER 2 | 11:54:33 22/01/2022 | Updated instance description |
| John Doe | 11:54:33 | Disabled the integration |

APPARATUSES, COMPUTER PROGRAM PRODUCTS, AND COMPUTER-IMPLEMENTED METHODS FOR INTEGRATING THIRD-PARTY DEVICES

TECHNICAL FIELD

Embodiments of the present disclosure are generally directed to providing data integrations, and specifically to improved managing of third-party integration(s) associated with third-party device(s) utilizing particular integration templates.

BACKGROUND

In several contexts, a particular entity managing a particular system desires to integrate a third-party device into said system. The third-party device may provide particular functionality, such as data monitoring capabilities, that supplement existing functionality of the system and/or are not otherwise available within the system without such third-party device(s). In many of such circumstances, however, other device(s) and/or system(s) that coordinate or otherwise execute such system monitoring cannot natively connect with such third-party device(s) in a manner that sufficiently enables such monitoring to occur without cumbersome manual integrations designed and maintained for each third-party integration.

Applicant has discovered problems with current implementations of integrating third-party device(s) and managing such integrations. Through applied effort, ingenuity, and innovation, Applicant has solved many of these identified problems by developing embodied in the present disclosure, which are described in detail below.

BRIEF SUMMARY

In one aspect, a computer-implemented method for managing third-party integrations includes receiving, at a templating system, template information that includes at least source schema data, target schema data, and template transformation data defining at least one data transformation from the source schema data to the target schema data, generating, at the templating system, an integration template based at least in part on the template information, enabling a client system to access at least the integration template via the templating system, and in response to receiving a selection of the integration template at the templating system, initiating, at the client system, an integration instance based at least in part on the integration template.

The computer-implemented method may also include where the templating system enables the client system to access a plurality of integration templates, where the integration template is selected from the plurality of integration templates.

The computer-implemented method may further include receiving an integration key via the client system, and initiating the integration instance based at least in part on the integration key.

The computer-implemented method may further include receiving, at the templating system, a filter rule set, and generating the integration template based at least in part on the filter rule set.

The computer-implemented method may further include receiving, at the templating system, a flow definitions set, and generating the integration template based at least in part on the flow definitions set.

The computer-implemented method may further include, in response to a request from the client system, providing at least a portion of the template information associated with the integration template.

The computer-implemented method may further include providing the client system access to one of the source schema data or the target schema data, but not both.

The computer-implemented method may further include receiving updated information corresponding to an integration template, and in response to receiving the updated information corresponding to the integration template, automatically pushing the updated information to the integration instance associated with the integration template, where the integration instance is updated based at least in part on the updated information upon pushing the updated information.

The computer-implemented method may further include receiving updated information corresponding to an integration template, and in response to receiving the updated information corresponding to the integration template, automatically generating a notification to the client system indicating that the updated information is retrievable via the templating system, where the integration instance is updated based at least in part on the updated information upon pushing the updated information.

The computer-implemented method may further include causing rendering of a dashboard at the client system, the dashboard includes at least one interface element representing a plurality of integration instances initiated associated with the client system.

The computer-implemented method may further include causing rendering of a dashboard at the client system, the dashboard includes at least one interface element representing an integration action log, where the integration action log indicates at least one change to the integration template corresponding to the integration instance.

In another aspect, a computer-implemented method includes accessing a templating system, browsing, via the templating system, a plurality of integration templates, selecting an integration template from the plurality of integration templates, where the integration template is configured based at least in part on template information to enable at least one data transformation from source schema data to target schema data based at least in part on template transformation data, and in response to selecting the integration template, automatically initiating an integration instance based at least in part on the integration template.

The computer-implemented method may further include receiving user input representing an integration key, and initiating the integration instance based at least in part on the integration key.

The computer-implemented method may further include receiving user input representing parameter override transformation data that overrides at least a portion of the template transformation data of the integration template, and initiating the integration instance based at least in part on the parameter override transformation data.

The computer-implemented method may further include causing rendering of a user interface includes the template information associated with the integration template.

The computer-implemented method may further include causing rendering of a user interface includes a first identifier of the target schema data and a second identifier of the source schema data, where the user interface is configured to enable access to one of the target schema data or the source schema data, but not both.

The computer-implemented method may further include automatically receiving updated information corresponding to the integration template of the integration instance, and in response to receiving the updated information, updating the integration instance based at least in part on the updated information.

The computer-implemented method may further include automatically receiving a notification indicating that updated information associated with the integration instance is retrievable via the templating system, receiving data indicating an intent to update the integration instance based on the updated information, receiving the updated information corresponding to the integration template of the integration instance in response to the request, and in response to receiving the updated information, updating the integration instance based at least in part on the updated information.

The computer-implemented method may further include causing rendering of a dashboard, where the dashboard includes at least one interface element representing each initiated integration instance of a plurality of integration instances.

The computer-implemented method may further include causing rendering of a dashboard, where the dashboard includes at least one interface element representing an integration action log, where the integration action log indicates at least one change to the integration template corresponding to the integration instance. Other technical features may be readily apparent to one skilled in the art from the following figures, descriptions, and claims.

The computer-implemented method may further include in response to receiving an update request from the client system, automatically pushing the updated information to the integration instance associated with the integration template.

The computer-implemented method may also include where the dashboard further includes at least one additional interface element configured to activate the integration instance and/or deactivate the integration instance.

The computer-implemented method may also include where the dashboard further includes at least one additional interface element configured to activate each initiated integration instance of the plurality of integration instances and/or deactivate each integration instance of the plurality of integration instances.

In another aspect, an apparatus is provided. The apparatus includes at least one processor and at least one non-transitory memory having computer-coded instructions stored thereon that, in execution with the at least one processor causes the apparatus to perform any one of the example computer-implemented methods described herein.

In another aspect, a computer program product is provided. The computer program product includes at least one non-transitory computer-readable storage medium having computer program code stored thereon that, in execution with at least one processor, configures the computer program product to perform any One of the example computer-implemented methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 16 illustrates an example user interface in accordance with at least one embodiment of the present disclosure;

FIG. 18 illustrates an example user interface in accordance with at least one embodiment of the present disclosure;

DETAILED DESCRIPTION

Figure 1:
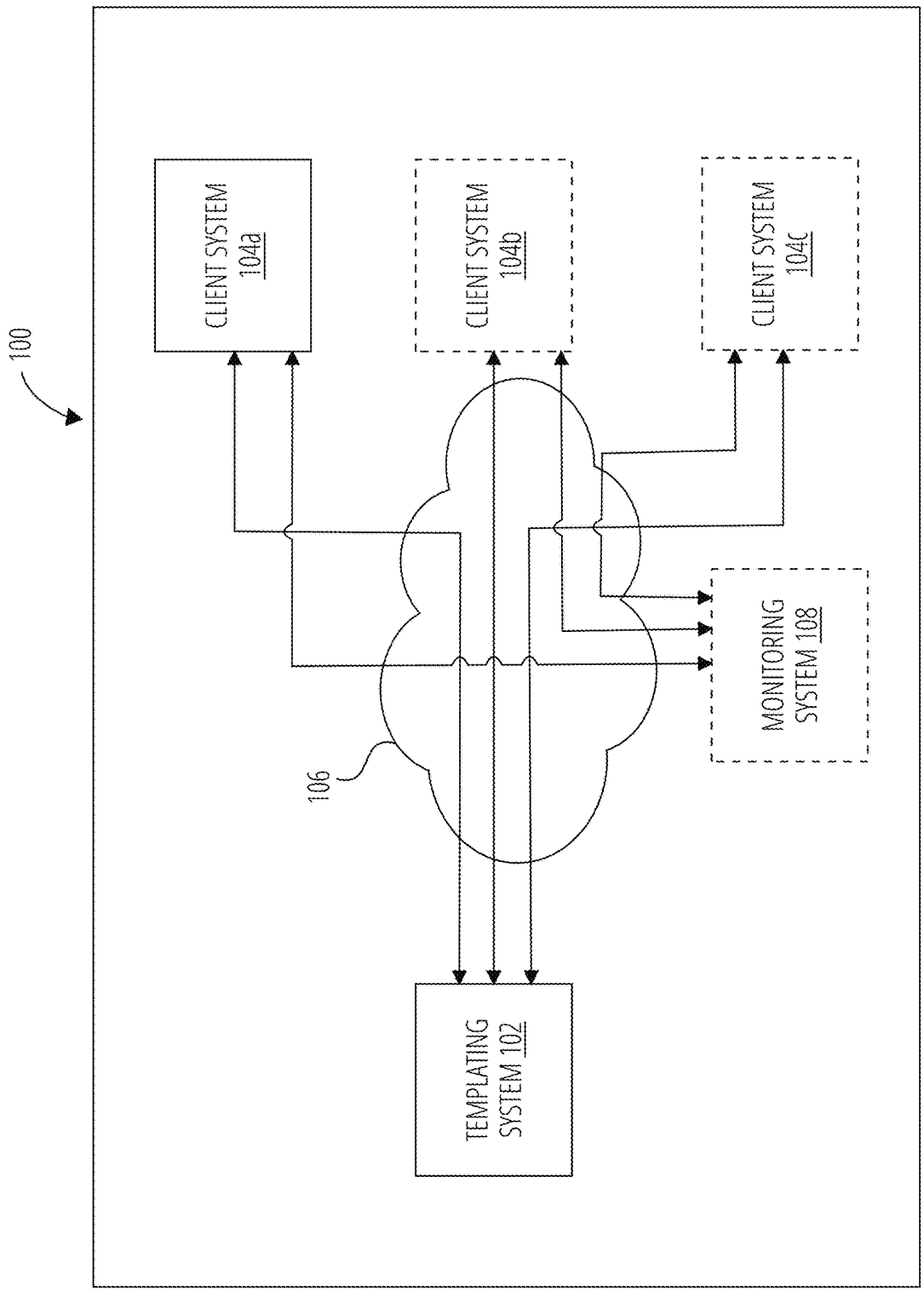
FIG. 1 illustrates an example system within which embodiments of the present disclosure may operate.

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

OVERVIEW

In various circumstances, two applications associated with two systems are expected to exchange data. For example, in some contexts, an enterprise requires two applications to exchange data for the for the ecosystem to stay connected (e.g., connecting the two systems). Such an ecosystem may be up to date such that the data communicated between the systems remains up to date, and such that visualizations and calculations based on such data may remain up to date based on the communicated data. One such example ecosystem includes a client system within one or more device(s) to be monitored by a centralized or remote monitoring system, including where third-party device(s) and corresponding application(s) are utilized to enable at least part of the monitoring.

Often, an integration is created and maintained to enable two applications to communicate and exchange data. Many times, an enterprise creates an integration by manually integrating the third-party device and corresponding application with the enterprise's system. Such manual integration, however, requires specific technical knowledge by a user of the enterprise (e.g., a programmer), manual coding of the integration by the user of the enterprise, and preparation and uploading of various configuration files and the like that enables use of such files to configure an integration. Such integration creation processes suffer from a myriad of deficiencies, including significant delays and complexity in time-till-integrated, requirements of specialized knowledge to implement the integration, significant cost of resources in terms of computer resources, manpower, and economic resources, and the like. Such creation processes for new integrations also suffer to being error prone due to manual errors introduced during the manual development and/or deployment of the integration. Additionally, each individual instantiation of a different integration requires that such efforts be repeated, leading to a compounding of such deficiencies as the number of integrations required grows.

Embodiments of the present disclosure provide for template-based integration instantiation. Embodiments include generation and maintenance of integration template(s) that that are stored, searchable, and/or made accessible in a centralized platform. Any of the integration template(s) may be specially configured to enable initiation of a new integration instance based on the integration template, where the new integration instance enables communication between two systems (for example, a third-party device and a monitoring system). For example, a particular integration instance may serve as a software application that facilitates communication between a third-party system that collect(s) and/or otherwise gathers data with a corresponding external system embodying a centralized monitoring system, such as Honeywell Forge. Using such integration template(s), new integration instance(s) may be instantiated quickly and accurately as compared to the aforementioned manual process. Additionally, embodiments utilizing the integration template(s) enable instantiation of integration instances with reduced errors and costs as compared to the aforementioned manual process. Accordingly, embodiments of the present disclosure provide a myriad of technical improvements to the operation of such system(s), and provide technical improvements within the technical field of integrating third-party device(s) and interrelated system(s).

Some embodiments further provide a myriad of improved user interfaces for creating, accessing, managing, and/or otherwise interacting with integration instance(s). For example, some embodiments provide for specially configured user interface(s) that enable an end user to search and select from a plurality of integration templates, such that the user may select a particular integration template that minimizes the time-to-integration for a particular use case or the like. Additionally or alternatively, some embodiments provide for specially configured user interface(s) that provide access to specific information associated with an integration instance and/or associated integration template, for example template information that can inform a user regarding appropriate use of the template. Additionally or alternatively still, some embodiments provide for specially configured user interface(s) that enables effective and efficient control of activation and deactivation, and/or creation, of a plurality of integration instances. Additionally or alternatively still, some embodiments provide specially configured user interface(s) for interacting with updates to integration instance(s), for example based on updates to a corresponding integration template. In this regard, such embodiments provide for a myriad of specific user interfaces that resolve technical problems associated with creating data integrations, managing data integrations, and/or managing data integrations.

Definitions

"Available update" refers to a state of data of an integration template that indicates that the data of the integration template has been updated to a new version that includes one or more new data value(s) of the data from a previous version of the integration template.

"Client system" refers to one or more computing device(s), each embodied in hardware, software, firmware, or any combination thereof, that enables instantiation of an integration instance based on an integration templates. In some embodiments, the client system is configured to utilizes an integration instance to communicate with an external computing device.

"Data schema" refers to structured data representing an organization of one or more data properties and/or data values corresponding to such data properties.

"Data transformation" refers to a computer-implemented instructions that transform data of a first data schema to data of a second data schema.

"Filter rule" refers to computing logic that filters at least a portion of data associated with a first data schema during transformation of the first data schema to a second data schema. "Filter rule set" refers to one or more data structure(s) that include any number of filter rules.

"Flow definition" refers to computing logic that defines a computing-driven description of a flow of transformation between a first data schema and a second data schema. "Flow definitions set" refers to one or more data structure(s) that include any number of flow definitions.

"Instance information" refers to electronically managed data that configures use of a particular integration instance Non-limiting examples of instance information includes parameter override transformation data, template information of an integration template corresponding to the integration instance, an integration instance name, an integration key, and an integration description.

"Integration" refers to a software application, or application embodied in a combination of software, firmware, and/or hardware, that enables communication of data between a third-party application associated with a third-party device and a second system . . . .

"Integration access data" refers to electronically managed data that facilitates a state of authorized communication between a particular integration instance and another system.

"Integration action log" refers to electronically managed data embodying configuration change(s) and/or data representing other action(s) performed that affect a particular integration instance or associated integration template.

"Integration instance" refers to a particular integration generated by and/or otherwise maintained associated with a particular client system, where the integration instance enables data communication between the client system and a second system.

"Integration key" refers to a unique identifier that identifies an integration that enables secured communication via the integration.

"Integration template" refers to one or more data object(s) that includes or is configured based at least in part on template information that at least defines data and/or computer-coded instructions for transforming source schema data of a first data schema to target schema data of a second data schema. An integration template is usable to instantiate a particular instance of an integration based on the integration template, the instance embodying a particular integration instance.

"Interface element" refers to any visually renderable object, control, sub-interface, display, and/or depictable portion of data. Non-limiting examples of an interface element include a text label, an image, a button, a radio button, a checkbox, a scroll box, a hyperlink, and a custom renderable data field.

"Parameter override transformation data" refers to electronically managed data corresponding to a particular integration instance, where such data overrides or supplements a data transformation defined by template transformation data associated with an integration template corresponding to the particular integration instance.

"Source schema data" refers to a first data schema associated with data to be transformed to a second data schema via data transformations defined by an integration template.

"Target schema data" refers to a second data schema to which source schema data is to be transformed via data transformations defined by an integration template.

"Template information" refers to electronically managed data that configures use of a particular integration template to support a particular integration. Non-limiting examples of template information includes source schema data, target schema data, and template transformation data. In some embodiments template information includes data automatically retrieved, retrieved via a network, loaded from a file system, or otherwise received via user input.

"Template transformation data" refers to computing logic that facilitates transformation of a first data parameter of source schema data to a second data parameter of target schema data.

"Templating system" refers to one or more device(s) embodied in hardware, software, firmware, and/or a combination thereof that facilitates generation of integration template(s), storage of integration template(s), and/or access to integration template(s) to initiate an integration instance based on an integration template.

"Update request" refers to electronically managed data indicating a user-initiated request to update an integration instance corresponding to a particular integration template based on an update to the particular integration template.

"Updated information" refers to electronically managed data representing a change in template information embodying a configuration of a particular integration template.

"User input" refers to electronically managed data representing an engagement by a user with a system, user interface, or other input mechanism. Non-limiting examples of user input include a keypress, a mouse click, a voice command, a gesture, a touch, a pinch, a peripheral input, and a sensor-detected event (e.g., a device shake, a device rotation, and/or a detected predetermined device movement).

Example Systems and Apparatuses of the Disclosure

FIG. 1 illustrates a block diagram of a system that may be specially configured within which embodiments of the present disclosure may operate. Specifically, FIG. 1 depicts an example system 100. As illustrated, the system 100 includes a templating system 102, one or more client systems (e.g., client system 104a, client system 104b, and client system 104c), and optionally a monitoring system 108. In some embodiments, the templating system 102, client system 104a-104c, and/or monitoring system 108 communicate over one or more communication network(s), for example a communications network 106.

It should be appreciated that the communications network 106 in some embodiments is embodied in any of a myriad of network configurations. In some embodiments, the communications network 106 embodies a public network (e.g., the Internet). In some embodiments, the communications network 106 embodies a private network (e.g., an internal localized, or closed-off network between particular devices). In some other embodiments, the communications network 106 embodies a hybrid network (e.g., a network enabling internal communications between particular connected devices and external communications with other devices). The communications network 106 in some embodiments includes one or more base station(s), relay(s), router(s), switch(es), cell tower(s), communications cable(s) and/or associated routing station(s), and/or the like. In some embodiments, the communications network 106 includes one or more user controlled computing device(s) (e.g., a user owned router and/or modem) and/or one or more external utility devices (e.g., Internet service provider communication tower(s) and/or other device(s)).

Each of the components of the system 100 communicatively coupled to transmit data to and/or receive data from one another over the same or different wireless and/or wired networks embodying the communications network 106. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 106, the various embodiments are not limited to this architecture. In other embodiments, one or more computing entities share one or more components, hardware, and/or the like, or otherwise are embodied by a single computing device such that connection(s) between the computing entities are over the communications network 106 are altered and/or rendered unnecessary. For example, in some embodiments, the templating system 102 includes some or all of a client system (e.g., one of the client systems 104a-104c), such that an external communications network 106 is not required.

In some embodiments, the client system(s) is/are embodied in an on-premises system within or associated with a particular industrial system, for example including any number of third-party device(s), sensor(s), and/or the like, that collects operating data associated with units of the industrial system. For example, the sensors may include any number of building sensors, pressure sensors, temperature sensors, process-specific sensors, and/or the like. Additionally or alternatively, in some embodiments, the a client system 104a and a corresponding templating system, such as the templating system 102, Additionally or alternatively, in some embodiments, the a client system 104a and a corresponding monitoring system, such as the monitoring system 108, are embodied as on-premises systems associated with a particular industrial system. In some embodiments, the on-premises systems are communicatively coupled via at least one wired device. Additionally or alternatively, one or more of such systems may be remote from one another, for example where the client system represents an on-premises system corresponding to a particular industrial system being monitored, and where the templating system 102 is a cloud system or otherwise remotely located from the client system. Additionally or alternatively, in some such embodiments the client system represents an on-premises system corresponding to a particular industrial system being monitored, and where the monitoring system 108 is a cloud system or otherwise remotely located from the client system.

A client system, for example one or more of the client system 104a-104c, includes any number of computing device(s), system(s), physical component(s), and/or the like, that facilitates generation and/or use of integration instance(s). In some embodiments, a client system includes or otherwise is communicable with a sensor, including one or more third-party device produced and/or otherwise configured by a third-party entity to collect data associated with particular operational aspects of an industrial system. Alternatively or additionally, in some embodiments, a client system includes any number of the sensor(s), third-party device(s), and/or the like that monitor particular operational aspects of an industrial system. In some such embodiments, the client system is embodied as a subsystem of the industrial system itself. In some embodiments, a client system, such as the client system 104a, client system 104b, and/or client system 104c, initiates, maintains, or uses the integration instances to collect such monitored data and/or communicate collected monitored data via the integration instance. In some embodiments, a client system includes one or more end user terminal(s), server(s), and/or the like that are configured to perform such functions.

The templating system 102 includes one or more computing device(s), system(s), and/or the like embodied in hardware, software, firmware, and/or a combination thereof, that performs generation and/or maintenance of any number of integration templates. In some embodiments, the templating system 102 includes one or more specially configured application server(s), database server(s), end user device(s), cloud computing system(s), and/or the like. Additionally or alternatively, in some embodiments, the templating system 102 includes one or more user device(s) that enables access to functionality provided by the templating system 102, for example via a web application, native application, and/or the like. Alternatively or additionally still, in some embodiments, a client system is specially configured to provide access to the functionality of the client system.

In some embodiments, the templating system 102 in conjunction with a client system(s), is configured to facilitate generation, storage, and/or maintenance of at least one integration template. The templating system 102 is configured to enable initiation of an instance of an integration template based at least in part on the integration template, for example such that the new integration instance may be utilized to collect and/or communicate particular collected data. In some embodiments, each client system is associated with a particular authenticated account (e.g., a user account identifying a particular user or a particular enterprise account identifying a particular entity) such that the client system has access to particular integration instances corresponding to the authenticated account. Alternatively or additionally, in some embodiments, each client system of the client systems 104a-104c maintains its own integration instances and/or integration templates.

In some embodiments, the monitoring system 108 includes one or more computing device(s), system(s), and/or the like embodied in hardware, software, firmware, and/or a combination thereof, that performs collection and/or maintenance of data monitored associated with one or more device(s). For example, in some embodiments, the monitoring system 108 is communicable with a particular client system, such as the client system 104a, to collect particular data via integration instances associated with or otherwise utilized by the particular client system. In some embodiments, the monitoring system 108 maintains monitored data corresponding to each client system separately, for example such that monitored data associated with different users, accounts, and/or client systems can be accessed individually.

In some embodiments, the templating system 102, client system 104a-104c, and monitoring system 108 communicate with one another to perform the various actions described herein. For example, in some embodiments, templating system 102 and one or more of the client systems 104a-104c communicate to generate and store a new integration template. Additionally or alternatively, in some embodiments the templating system 102 and one or more of the client systems 104a-104c initiates a new integration instance based at least in part on a stored integration template. For example, in some embodiments, the templating system 102 and one or more of the client systems 104a-104c communicate to display, configure, and/or update integration templates and/or integration instances corresponding therewith. Additionally or alternatively, in some embodiments, one or more of the client system 104a-104c communicates with the monitoring system 108 to facilitate collection of monitored data via the integration instance(s) associated with that client system.

Figure 2:
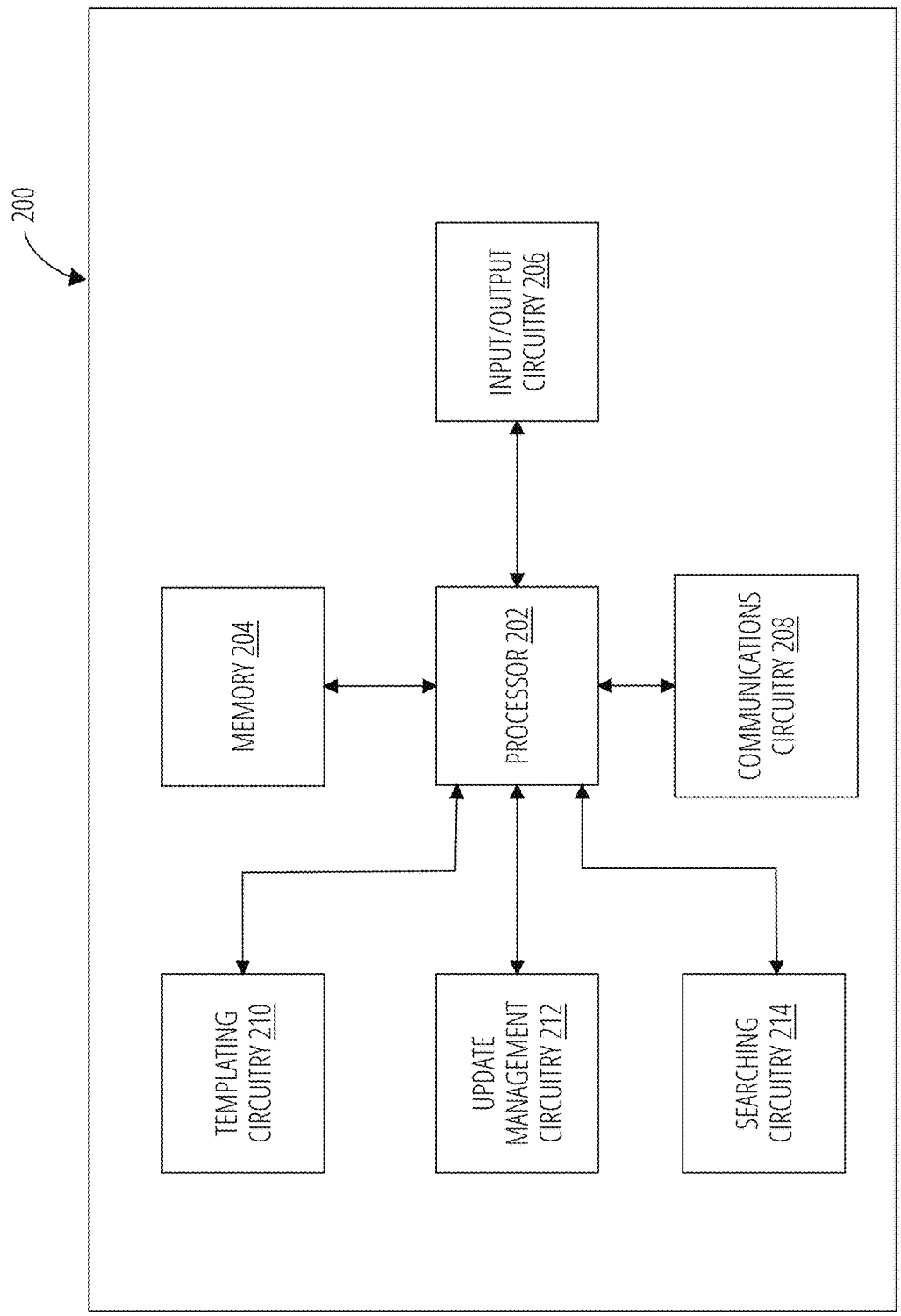
FIG. 2 illustrates a block diagram of an example apparatus embodying a templating system in accordance with at least one embodiment of the present disclosure.

FIG. 2 illustrates a block diagram of an example apparatus that may be specially configured in accordance with at least one example embodiment of the present disclosure. Specifically, FIG. 2 depicts an example templating apparatus ("apparatus 200") specially configured in accordance with at least some example embodiments of the present disclosure. In some embodiments, the templating system 102 and/or a portion thereof is embodied by one or more system(s), such as the apparatus 200 as depicted and described in FIG. 2. The apparatus 200 includes processor 202, memory 204, input/output circuitry 206, communications circuitry 208, templating circuitry 210, update management circuitry 212, and/or searching circuitry 214. In some embodiments, the apparatus 200 is configured, using one or more of the sets of circuitry embodied by processor 202, memory 204, input/output circuitry 206, communications circuitry 208, templating circuitry 210, update management circuitry 212 and/or searching circuitry 214, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

As one particular example embodiment, the processor 202 is configured to perform various operations associated with integration template generation and use. In some such embodiments, the processor 202 includes hardware, software, firmware, and/or a combination thereof that generates an integration template. Additionally or alternatively, in some embodiments, the processor 202 includes hardware software, firmware, and/or a combination thereof that maintains a plurality of integration templates for use in generating a new integration instance. Additionally or alternatively, in some embodiments, the processor 202 includes hardware software, firmware, and/or a combination thereof that initiates a new integration instance based at least in part on a particular integration template. Additionally or alternatively, in some embodiments, the processor 202 includes hardware software, firmware, and/or a combination thereof that receives and pushes updates of integration template(s) and/or corresponding integration instance(s) that utilize an updated integration template. Additionally or alternatively, in some embodiments, the processor 202 includes hardware software, firmware, and/or a combination thereof that collect(s) and/or maintains data via one or more integration instance(s) of client system(s).

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from user device, one or more asset(s) or accompanying sensor(s), and/or other external computing device in communication with the apparatus 200.

In some embodiments, the apparatus 200 includes templating circuitry 210. The templating circuitry 210 includes hardware, software, firmware, and/or a combination thereof, that supports generation and use of an integration template. For example, in some embodiments, the templating circuitry 210 includes hardware, software, firmware, and/or a combination thereof, that receives template information associated with a new integration template. Additionally or alternatively, in some embodiments, the templating circuitry 210 includes hardware, software, firmware, and/or a combination thereof, that receives a selected integration or integration template from which the new integration template is to be generated. Additionally or alternatively, in some embodiments, the templating circuitry 210 includes hardware, software, firmware, and/or a combination thereof, that maintains at least one data repository comprising any number of generated integration templates associated with a particular client system. In some embodiments, templating circuitry 210 includes a separate processor, specially configured field programmable gate array (FPGA), or a specially programmed application specific integrated circuit (ASIC).

In some embodiments, the apparatus 200 includes update management circuitry 212. The update management circuitry 212 includes hardware, software, firmware, and/or a combination thereof, that supports updating of a stored integration template. For example, in some embodiments, the update management circuitry 212 includes hardware, software, firmware, and/or a combination thereof, that receives updated information associated with an integration template. Additionally or alternatively, in some embodiments, the update management circuitry 212 includes hardware, software, firmware, and/or a combination thereof, that generates an updated integration template based at least in part on updated information. Additionally or alternatively, in some embodiments, the update management circuitry 212 includes hardware, software, firmware, and/or a combination thereof, that stores an updated integration template as a new version of a particular integration template. Additionally or alternatively, in some embodiments, the update management circuitry 212 includes hardware, software, firmware, and/or a combination thereof, that presents and/or causes rendering of a notification indicating an available update corresponding to the updated integration template. In some embodiments, update management circuitry 212 includes a separate processor, specially configured field programmable gate array (FPGA), or a specially programmed application specific integrated circuit (ASIC).

In some embodiments, the apparatus 200 includes searching circuitry 214. The searching circuitry 214 includes hardware, software, firmware, and/or a combination thereof, that supports searching of integration templates for initiation of a new integration instance corresponding to the integration template. For example, in some embodiments, the searching circuitry 214 includes hardware, software, firmware, and/or a combination thereof, that receives search data. Additionally or alternatively, in some embodiments, the searching circuitry 214 includes hardware, software, firmware, and/or a combination thereof, that determines search result data integration instances and/or integration templates relevant to particular inputted search data. Additionally or alternatively, in some embodiments, the searching circuitry 214 includes hardware, software, firmware, and/or a combination thereof, that provides and/or causes rendering of the search results. In some embodiments, searching circuitry 214 includes a separate processor, specially configured field programmable gate array (FPGA), or a specially programmed application specific integrated circuit (ASIC).

Additionally or alternatively, in some embodiments, two or more of the sets of circuitries embodying processor 202, memory 204, input/output circuitry 206, communications circuitry 208, templating circuitry 210, update management circuitry 212, and searching circuitry 214. Alternatively or additionally, in some embodiments, one or more of the sets of circuitry perform some or all of the functionality described associated with another component. For example, in some embodiments, two or more of the sets of circuitry embodied by processor 202, memory 204, input/output circuitry 206, communications circuitry 208, templating circuitry 210, update management circuitry 212, and/or searching circuitry 214, are combined into a single module embodied in hardware, software, firmware, and/or a combination thereof. Similarly, in some embodiments, one or more of the sets of circuitry, for example templating circuitry 210, update management circuitry 212, and/or searching circuitry 214, is/are combined with the processor 202, such that the processor 202 performs one or more of the operations described above with respect to each of these sets of circuitry embodied by the templating circuitry 210, update management circuitry 212, and/or searching circuitry 214.

Figure 3:
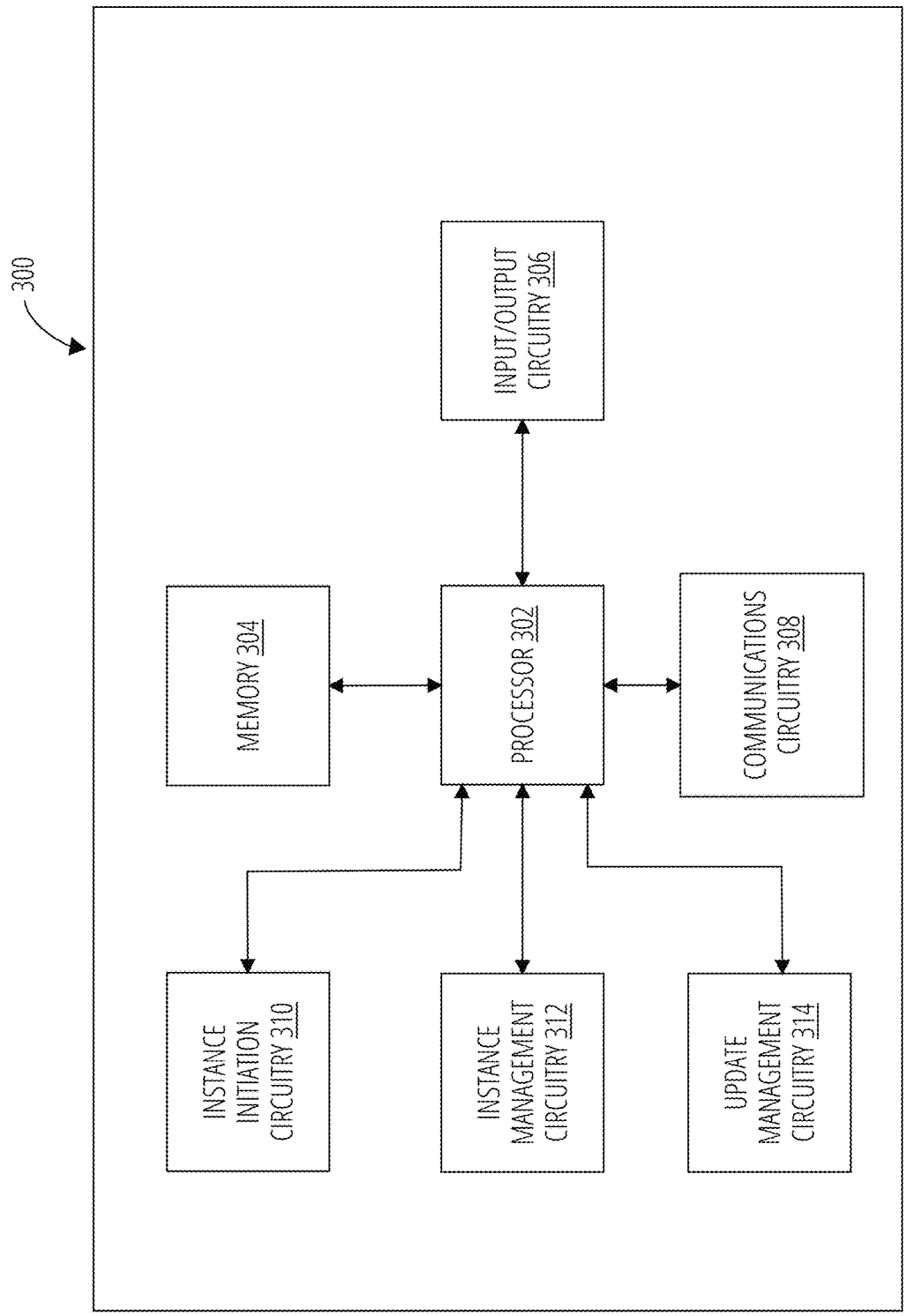
FIG. 3 illustrates a block diagram of an example apparatus embodying a client system in accordance with at least one embodiment of the present disclosure.

FIG. 3 illustrates a block diagram of an example apparatus embodying a client system in accordance with at least one embodiment of the present disclosure. Specifically, FIG. 3 illustrates an example client apparatus 300 ("apparatus 300") specifically configured in accordance with at least one example embodiment of the present disclosure. In some embodiments each of the client systems 104a-104c is/are embodied by one or more system(s), device(s), and/or the like, such as the apparatus 300 as depicted and described in FIG. 3. The apparatus 300 includes processor 302, memory 304, input/output circuitry 306, communications circuitry 308, instance initiation circuitry 310, instance management circuitry 312, and update management circuitry 314. In some embodiments, the apparatus 300 is configured, using one or more of the processor 302, memory 304, input/output circuitry 306, communications circuitry 308, instance initiation circuitry 310, instance management circuitry 312, and update management circuitry 314, to execute and perform one or more of the operations described herein.

In some embodiments, the processor 302, memory 304, input/output circuitry 306, and communications circuitry 308, function similarly or identically to the similarly named sets of circuitry embodying processor 202, memory 204, input/output circuitry 206, and communications circuitry 208 as depicted and described with respect to the apparatus 200 in FIG. 2. Additionally or alternatively, in some embodiments, the processor 302 includes hardware, software, firmware, and/or a combination thereof, that supports functionality performed by the client systems as depicted and described with respect to FIG. 1. For example, in some embodiments, the processor 302 includes hardware, software, firmware, and/or a combination thereof, that supports initiation, maintenance, and/or use of an integration instance based on an integration template. For purposes of brevity, repeated disclosure with respect to the functionality of such similarly-named sets of circuitry is omitted herein.

In some embodiments, the apparatus 300 includes instance initiation circuitry 310. The instance initiation circuitry 310 includes hardware, software, firmware, and/or a combination thereof, that supports initiation of a new integration instance based at least in part on a corresponding integration template. For example, in some embodiments, the instance initiation circuitry 310 includes hardware, software, firmware, and/or a combination thereof, that receives a selection of an integration template for use. Additionally or alternatively, in some embodiments The templating circuitry 210 includes hardware, software, firmware, and/or a combination thereof, that supports generation and use of an integration template. For example, in some embodiments, the templating circuitry 210 includes hardware, software, firmware, and/or a combination thereof, that receives template information associated with a new integration template. Additionally or alternatively, in some embodiments, the instance initiation circuitry 310 includes hardware, software, firmware, and/or a combination thereof, that causes rendering of a user interface for selecting an integration template. Additionally or alternatively, in some embodiments, the instance initiation circuitry 310 includes hardware, software, firmware, and/or a combination thereof, that receives instance information for use in initiating a new integration instance. Additionally or alternatively, in some embodiments, the instance initiation circuitry 310 includes hardware, software, firmware, and/or a combination thereof, that configures an integration instance based at least in part on integration instance. In some embodiments, instance initiation circuitry 310 includes a separate processor, specially configured field programmable gate array (FPGA), or a specially programmed application specific integrated circuit (ASIC).

Additionally, in some embodiments the apparatus 300 includes instance management circuitry 312. The instance management circuitry 312 includes hardware, software, firmware, and/or a combination thereof, that supports storing and use of integration instance(s). For example, in some embodiments, the instance management circuitry 312 includes hardware, software, firmware, and/or a combination thereof, that maintains access to integration instances associated with a particular client system. Additionally or alternatively, in some embodiments, the instance management circuitry 312 includes hardware, software, firmware, and/or a combination thereof, that collects, processes, and/or communicates data from a connected device, for example a third-party device, utilizing at least one integration instance. Additionally or alternatively, in some embodiments, the instance management circuitry 312 includes hardware, software, firmware, and/or a combination thereof, that provides access to instance information associated with particular integration instance(s). Additionally or alternatively, in some embodiments, the instance management circuitry 312 includes hardware, software, firmware, and/or a combination thereof, that enables activation, deactivation, and/or reconfiguration of one or more integration instance(s). In some embodiments, instance management circuitry 312 includes a separate processor, specially configured field programmable gate array (FPGA), or a specially programmed application specific integrated circuit (ASIC).

Additionally, in some embodiments the apparatus 300 includes update management circuitry 314. The update management circuitry 314 includes hardware, software, firmware, and/or a combination thereof, that supports updating of integration instances and/or corresponding integration template(s). For example, in some embodiments, the update management circuitry 314 includes hardware, software, firmware, and/or a combination thereof, that receives update request(s) associated with a particular integration instance. Additionally or alternatively, in some embodiments, the update management circuitry 314 includes hardware, software, firmware, and/or a combination thereof, that receives updated information associated with a particular integration template or particular integration instance. Additionally or alternatively, in some embodiments, the update management circuitry 314 includes hardware, software, firmware, and/or a combination thereof, that updates an integration instance based at least in part on received updated information. Additionally or alternatively, in some embodiments, the update management circuitry 314 includes hardware, software, firmware, and/or a combination thereof, that maintains and/or provides access to an integration action log associated with a particular integration instance, where the integration action log represents configuration changes, updates, and/or other changes to the integration instance or a corresponding integration template. In some embodiments, update management circuitry 314 includes a separate processor, specially configured field programmable gate array (FPGA), or a specially programmed application specific integrated circuit (ASIC).

Additionally or alternatively, in some embodiments, two or more of the sets of circuitries embodying processor 302, memory 304, input/output circuitry 306, communications circuitry 308, instance initiation circuitry 310, instance management circuitry 312, and/or update management circuitry 314. Alternatively or additionally, in some embodiments, one or more of the sets of circuitry perform some or all of the functionality described associated with another component. For example, in some embodiments, two or more of the sets of circuitry embodied by processor 302, memory 304, input/output circuitry 306, communications circuitry 308, instance initiation circuitry 310, instance management circuitry 312, and/or update management circuitry 314, are combined into a single module embodied in hardware, software, firmware, and/or a combination thereof. Similarly, in some embodiments, one or more of the sets of circuitry, for example instance initiation circuitry 310, instance management circuitry 312, and/or update management circuitry 314, is/are combined with the processor 302, such that the processor 302 performs one or more of the operations described above with respect to each of these sets of circuitry embodied by the instance initiation circuitry 310, instance management circuitry 312, and/or update management circuitry 314.

Example Data Environments and Architectures of the Disclosure

Having described example systems and apparatuses of the disclosure, example data architectures, data environments, and data flows will now be described. In some embodiments, the data architectures represent data object(s) maintained and processed in in particular computing environments. In some embodiments, the computing environment(s) is/are maintained via hardware, software, firmware, and/or a combination thereof, that execute one or more software application(s) that manage such data. For example, in some embodiments, the apparatus 200 and/or apparatus 300 execute one or more software application(s) that maintain the data architecture(s) as depicted and described to, alone or in conjunction with one another, perform the functionality as depicted and described with respect to integration template generation and/or use, and/or integration instance generation and/or use.

Figure 4:
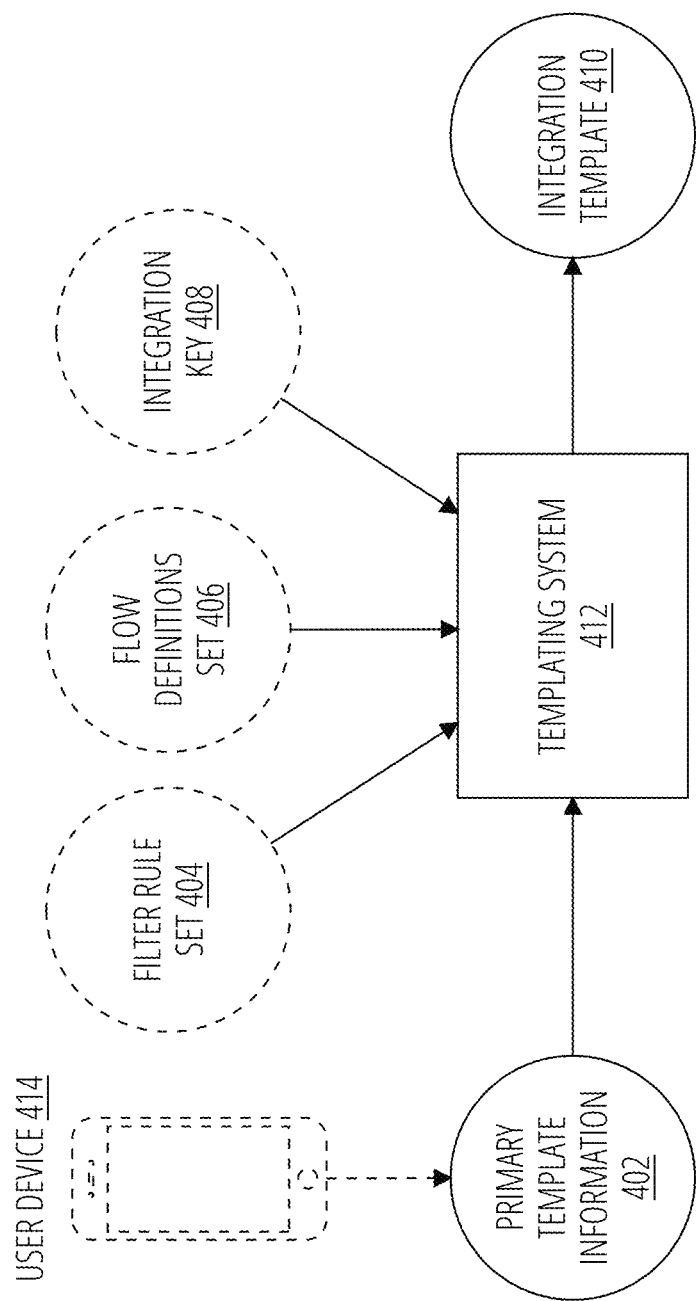
FIG. 4 illustrates a visualization of an example data environment for generating integration template(s) in accordance with at least one embodiment of the present disclosure.

FIG. 4 illustrates a visualization of an example data environment for generating integration template(s) in accordance with at least one embodiment of the present disclosure. Specifically, the data environment for generating the integration template is performed by a templating system 412. The templating system 412 may embody a particular implementation of the templating system 102 as depicted and described herein. For example, in some embodiments, the templating system is embodied by the apparatus 200 as depicted and described herein. In some embodiments, the templating system 412 causes rendering of, or otherwise provides access to, one or more user interfaces specially configured to enable inputting of the particular data portions as depicted and described herein.

As illustrated, the templating system 412 receives primary template information 402. In some embodiments, the primary template information 402 includes particular portions of template information required by the templating system 412 to generate a corresponding integration template 410. In some embodiments, the primary template information 402 include schema information utilized to generate the corresponding integration template, for example source schema data and/or target schema data. In some embodiments, one or more portions of the schema information is predetermined, for example in a circumstance where an integration template is created for communicating with (e.g., sending data to and/or receiving data from) a particular monitoring system associated with a particular data schema that is inaccessible to external users but accessible to the templating system 412. Additionally or alternatively, in some embodiments, the primary template information 402 includes template transformation data.

In some embodiments, the templating system 412 receives the primary template information 402 from a user device 414. The user device 414 in some embodiments is interactable by an end user, for example to access the functionality of the templating system 412. In some embodiments, the user device 414 is a smartphone, computer, tablet, or other end user device executing at least one software application for communicating with and/or accessing functionality of the templating system 412. Alternatively or additionally, in some embodiments, the user device 414 embodies a particular client system. In some embodiments, the filter rule set defines various filtration parameters that define the data to be pulled via the integration, for example from operation of a corresponding device and/or system being monitored.

In some embodiments, the templating system 412 includes one or more data portion(s) additionally to the primary template information 402. For example, in some embodiments, the templating system 412 receives a filter rule set 404, flow definitions set 406, and/or integration key 408. In some embodiments, the filter rule set 404 includes one or more filter rules to be applied to the new integration template. The flow definitions set 406 includes one or more flow definitions to be applied to the new integration template. The integration key 408 includes a particular unique key utilized to configure and/or access an API or other functionality associated with the new integration template. In some embodiments, the integration key 408 optionally is received during generation of a corresponding integration instance as depicted and described herein. In some embodiments, the flow definitions set defines the sequence of various steps involved to pull data via a particular integration. In this regard, the flow definitions set may define the particular sub-steps involved in pulling such data via an integration, and/or an ordered arrangement of such sub-steps to perform the pulling of such data.

Upon receiving all expected data, the templating system 412 generates integration template 410. The integration template 410 is specially configured based at least in part on the inputted data received at earlier steps. For example, as illustrated, the templating system 412 in some embodiments the integration template 410 is configured to enable initiation of integration instance(s) that perform data transformations represented by received template transformation data to convert received data corresponding to source schema data to output data corresponding to target schema data. Additionally or alternatively, in some embodiments, the templating system 412 configures the integration template 410 to apply a received filter rule set 404 and/or flow definitions set 406 to the received data during such transformations. In this regard, the integration template 410 may be utilized to initiate a corresponding integration instance that is automatically configured based at least in part on the integration template, and subsequently further configurable and/or alterable separate from other integration instances associated with the integration template. In some embodiments, the templating system 412 stores the integration template 410 in one or more data repository/repositories accessible to an end user, such that the integration templates may be accessed, browsed, searched, and/or otherwise identified and selected for use in initiation of a corresponding integration instance.

Figure 5:
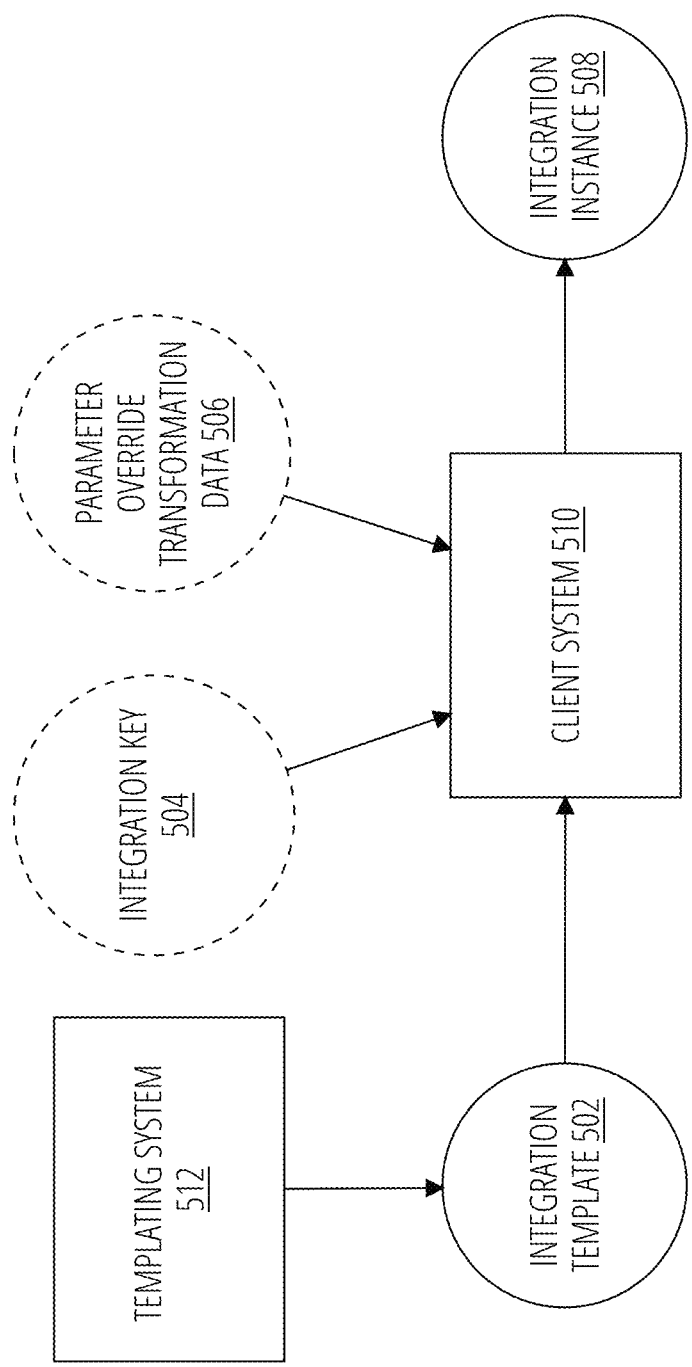
FIG. 5 illustrates a visualization of an example data environment for initiating integration instance(s) in accordance with at least one embodiment of the present disclosure.

FIG. 5 illustrates a visualization of an example data environment for initiating integration instance(s) in accordance with at least one embodiment of the present disclosure. Specifically, the data environment for initiating the integration instance is performed by a client system 510. The client system 510 may embody a particular implementation of one of the client systems client system 104a-104c as depicted and described herein. For example, in some embodiments, the client system is embodied by the apparatus 300 as depicted and described herein. In some embodiments, the client system 510 causes rendering of, or otherwise provides access to, one or more user interfaces specially configured to enable inputting of the particular data portions as depicted and described herein.

As illustrated, the client system 510 receives an integration template 502. In some embodiments, the templating system 512 receives the integration template 502 from a particular templating system, for example the templating system 512. In some embodiments, the templating system 512 embodies a particular implementation of the templating system 412. The templating system 512 may store and/or otherwise maintain any number of integration templates, each integration template selectable to create or otherwise initiate a new integration instance based at least in part on the integration template. In this regard, in some embodiments a user of the client system 510 selects a particular integration template that fits a particular use case intended for the new integration instance, for example based at least in part on a corresponding intended third-party device associated with the integration template 502, source schema data and/or target schema data that matches or is similar to the user's particular use case for the new integration instance, and/or the like. In one or more circumstances, an integration template may perfectly match a user's particular use case, such that independent integration instances need not undergo further customization to function properly.

Additionally or alternatively, in some embodiments, the client system 510 includes one or more optional and/or additional data portions. For example, in some embodiments, the client system 510 receives an integration key 504 that is utilized to specially configure, authenticate, and/or otherwise authorize the access of the new integration instance. Additionally or alternatively, in some embodiments, the client system 510 receives a parameter override transformation data 506. In some embodiments, the parameter override transformation data 506 defines one or more data transformation that override default data transformations represented by template transformation data of the integration template 502. For example, in some embodiments, the parameter override transformation data 506 may connect different data properties represented in the source schema data and target schema data, include a data transformation for particular data properties not represented in the source schema data and/or target schema data, represent different data processing operations for processing particular data properties, and/or the like.

In some embodiments, the client system 510 initiates the integration instance 508. In this regard, the initiation of the integration instance 508 in some embodiments represents generation of a discrete data object, application, and/or the like, specially configured based at least in part on the received inputted data. For example, in some embodiments, the integration instance 508 embodies or includes a particular application that is configured based at least in part on the integration template 502, integration key 504, and/or parameter override transformation data 506 to enable communication between one or more particular third-party devices and a corresponding monitoring system, for example embodied by a third-party monitoring system, the client system 510, and/or the templating system 512. In some embodiments, the client system 510 stores and/or otherwise maintains the integration instance 508, for example together with any number of integration instances utilized by the client system 510 to establish communication between various sensor(s), third-party device(s), and/or the like of a communicable industrial system. Alternatively or additionally, in some embodiments, the templating system 512 maintains the integration instances associated with the client system 510. For example, in some embodiments, the templating system 512 and the client system 510 are embodied by one system and/or platform that provides cloud-based functionality to an end-user that facilitates cloud-based monitoring of a user's industrial system. In some embodiments, the client system 510 is communicable or otherwise connected to one or more device(s) of the industrial system (not depicted), for example connected to particular sensor(s), third-party monitoring device(s), and/or sub-system(s) thereof, such that the integration instance 508 and/or other initiated integration instances are usable to monitor particular data via such connection(s).

Figure 6:
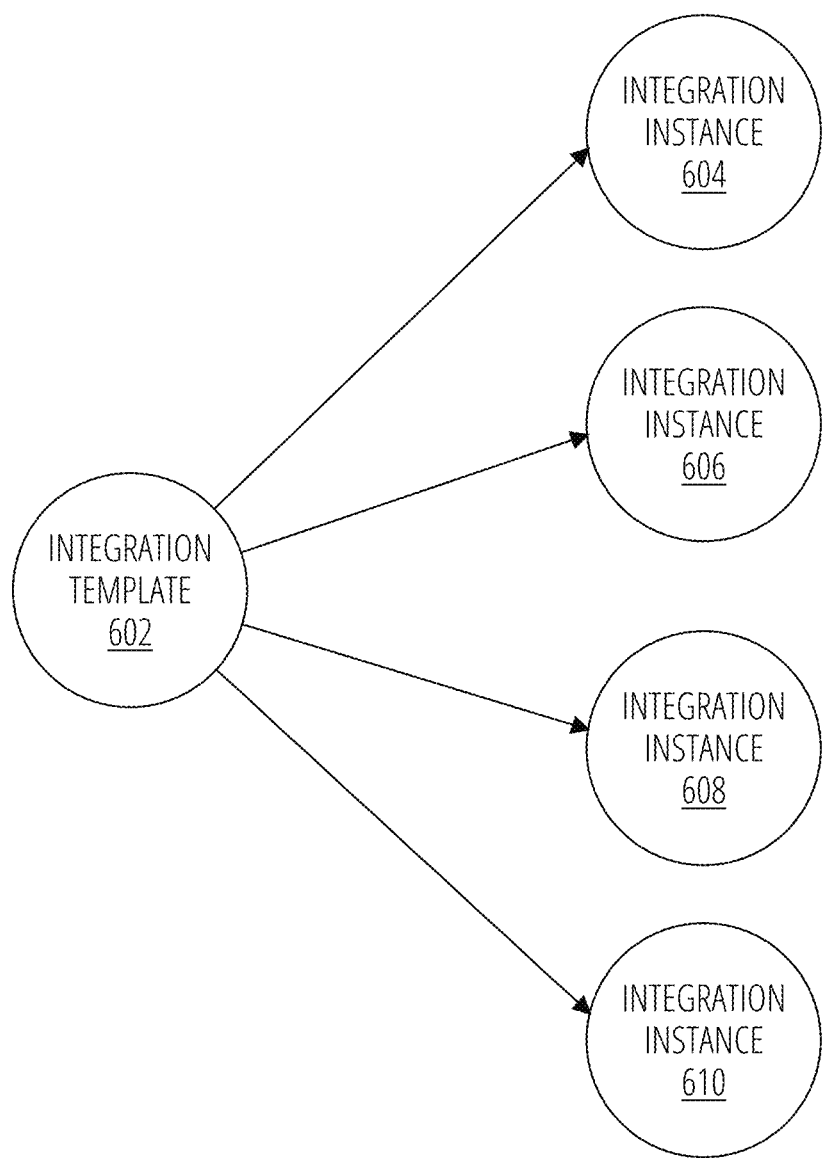
FIG. 6 illustrates a visualization of deployment of an integration template in initiation of a plurality of integration instances in accordance with at least one embodiment of the present disclosure.

FIG. 6 illustrates a visualization of deployment of an integration template in initiation of a plurality of integration instances in accordance with at least one embodiment of the present disclosure. Specifically, FIG. 6 depicts various integration instances 604, 606, 608, and 610 each initiated based at least in part on the same integration template 602.

In some embodiments, the integration instances 604-610 are each associated with the same client system. For example, in some embodiments, a single client system initiates a plurality of distinct integration instances to enable communication of different third-party devices via each of the integration instances. Additionally or alternatively, in some embodiments a client system initiates a plurality of integration instances based on the same integration template, and further changes and/or otherwise customizes configuration of one or more of the integration instances to fit a particular use case (e.g., handling of particular data properties not handled by the integration template 602 but required in the user's particular use case).

Additionally or alternatively, in some embodiments, one or more of the integration instances 604-610 is/are associated with different client systems. For example, in some embodiments, a first client system initiates integration instance 604 based at least in part on the integration template 602, such that the first client system may utilize the integration instance 604 to enable communication between monitored device(s) (e.g., a third-party device, sensor, and/or the like) and a corresponding monitoring system via the integration instance 604. Similarly, a second client system initiates integration instance 606 based at least in part on the integration template 602, such that the second client system may utilize the integration instance 606 to enable communication between its own monitored device(s) and a corresponding monitoring system via the integration instance 606. In this regard, the individual integration instances may be automatically configured upon initiation with particular shared configurations and/or parameters (e.g., for performing particular data transformations) based at least in part on the integration template 602, and may be separately maintained and customizable after being initiated.

In some embodiments, the integration template 602 remains linked to each of the integration instances 604, 606, 608, and 610. For example, in some embodiments, updates to the integration template 602 are provided as an available update associated with each of the integration instances 604, 606, 608, and 610. In this regard, the integration template 602 may be updated based at least in part on updated information received associated with the integration template 602 specifically. In some embodiments, as the updated information is received and utilized to update the integration template 602, the update may be made available as an available update for updating any one or more of the integration instances corresponding to the integration template 602. For example, in some embodiments the templating system managing the integration template 602 automatically pushes the available update to one or more of the integration instances 604-610, which causes updates the integration instance to be configured in accordance with the updated template information. Additionally or alternatively, in some embodiments, an available update associated with the integration template 602 is made available associated with each of the integration instances 604-610, and individual client systems may be utilized to initiate the update of one or more of the corresponding integration instances when desired by a user of the associated client system.

In some embodiments, a templating system, for example embodied by the apparatus 200, stores data embodying an integration action log associated with the integration template 602 in each circumstance where a user accesses and/or otherwise changes a configuration of the integration template 602. For example, in some embodiments such data includes a user identifier or account identifier corresponding to the entity that initiated a change of the integration template 602. Additionally or alternatively, in some embodiments, such data includes data indicating what properties or configurations of the integration template 602 were changed. Additionally or alternatively, in some embodiments, such data includes a user-entered description of what actions were performed with respect to the integration template 602. Additionally or alternatively, in some embodiments, such data includes a timestamp at which such a change was performed or initiated. In this regard, in some embodiments, such action log(s) are maintained in a set of integration action logs corresponding to such an integration template. Additionally or alternatively still, in some embodiments an integration action log is associated with a particular integration, such that changes to the configuration of the integration itself or a corresponding, linked integration template are reflected in the integration action log corresponding to that integration instance. In such embodiments, the integration action log for two different integration instances may include different actions performed with respect to such integration instances, but share actions performed with respect to a shared integration template, for example.

Example User Interfaces of the Disclosure

Having described example systems, apparatuses, data environments, and data architectures in accordance with the present disclosure, example user interfaces in accordance with the present disclosure will now be discussed. In some embodiments, the user interfaces are renderable via one or more of the device(s) described herein. For example, in some embodiments one or more of the user interfaces associated with integration template generation and/or management are renderable via a templating system. In some embodiments one or more of the user interfaces associated with integration instance generation and/or management are renderable via a client system. Such user interfaces may be rendered directly to a display of such system(s), and/or configured via data received from such system(s) and rendered via a corresponding user device communicatively coupled to such system(s). For example, in some embodiments, the user interfaces depicted in FIGS. 7-11 depict a first process facilitated by a templating system to generate a new integration template for subsequent use, and FIGS. 12-19 depict a second process facilitated by a client system in communication with a templating system to generate a new integration instance based at least in part on an integration template. In this regard, the user interfaces depicted with respect to FIGS. 7-19 depict non-limiting example user interfaces that support an end-to-end process for generating a new integration template and initiating a new integration instance based at least in part on that new integration template.

Figure 7:
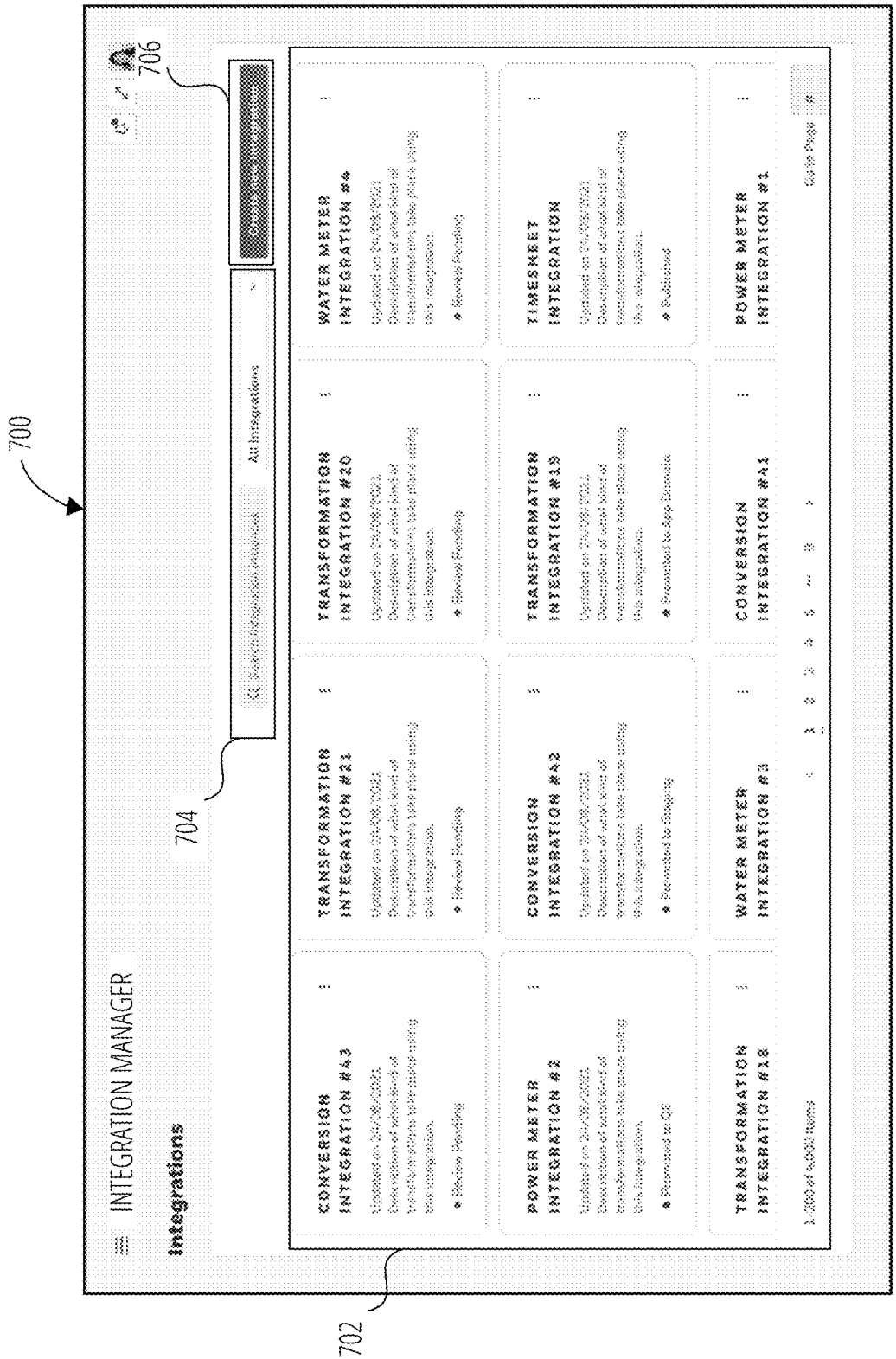
FIG. 7 illustrates an example user interface in accordance with at least one embodiment of the present disclosure.

FIG. 7 illustrates an example user interface in accordance with at least one embodiment of the present disclosure. Specifically, FIG. 7 depicts an example user interface 700. The user interface 700 embodies a user interface specially configured to enable viewing and/or searching of integration templates managed by a templating system. In some embodiments, the apparatus 200 causes rendering of the user interface 700.

The user interface 700 includes an integration template list sub-interface 702. The integration template list sub-interface 702 includes a plurality of interface elements that each represent a different integration. Each integration may be associated with an integration template of one or more integration template(s) managed by a templating system, for example embodied by the apparatus 200. The integration template list sub-interface 702 is configured to receive user input that indicates a selection of a particular integration from which a new integration template is to be generated. In this regard, the apparatus 200 receives data embodying the user input representing a selected integration instance, and from the selected integration instance identifies at least a portion of template information utilized in generating a new integration template. In some embodiments, the apparatus 200 maintains a data repository including each stored integration instance, and retrieves the stored integration instances for rendering via the integration template list sub-interface 702.

The user interface 700 further includes a template search sub-interface 704. The template search sub-interface 704 includes one or more interface element(s) that enables searching through, filtering, and/or otherwise limiting the integration instances represented in the integration template list sub-interface 702. For example, the template search sub-interface 704 includes a search bar configured to receive free text in response to user input, where the free text is utilized to limit the integration instances depicted in the corresponding integration template list sub-interface 702. In some embodiments, the text inputted into the template search sub-interface 704 is utilized to determine integration instances that are determined relevant to the inputted text based at least in part on any one of a myriad of known searching algorithm(s). Additionally or alternatively, in some embodiments, the template search sub-interface 704 includes one or more interface element(s) that enable filtering the set of stored integration instances based at least in part on a user-selected value for any data property associated with an integration instance and/or integration template, for example based at least in part on selected value(s) for particular data properties of template information of each integration template corresponding to such integration instance(s).

Additionally, user interface 700 includes new template sub-interface 706. In some embodiments, the new template sub-interface 706 includes one or more interface element(s) that enable a process for creation of a new integration template. As depicted, the new template sub-interface 706 includes a button configured to receive user input, where the user input indicates a user request to begin a process for generation of a new integration template. In some embodiments, the user input causes transition or generation of a different user interface associated with the process for generation of the new integration template, for example the user interface 800 as depicted and described herein.

Figure 8:
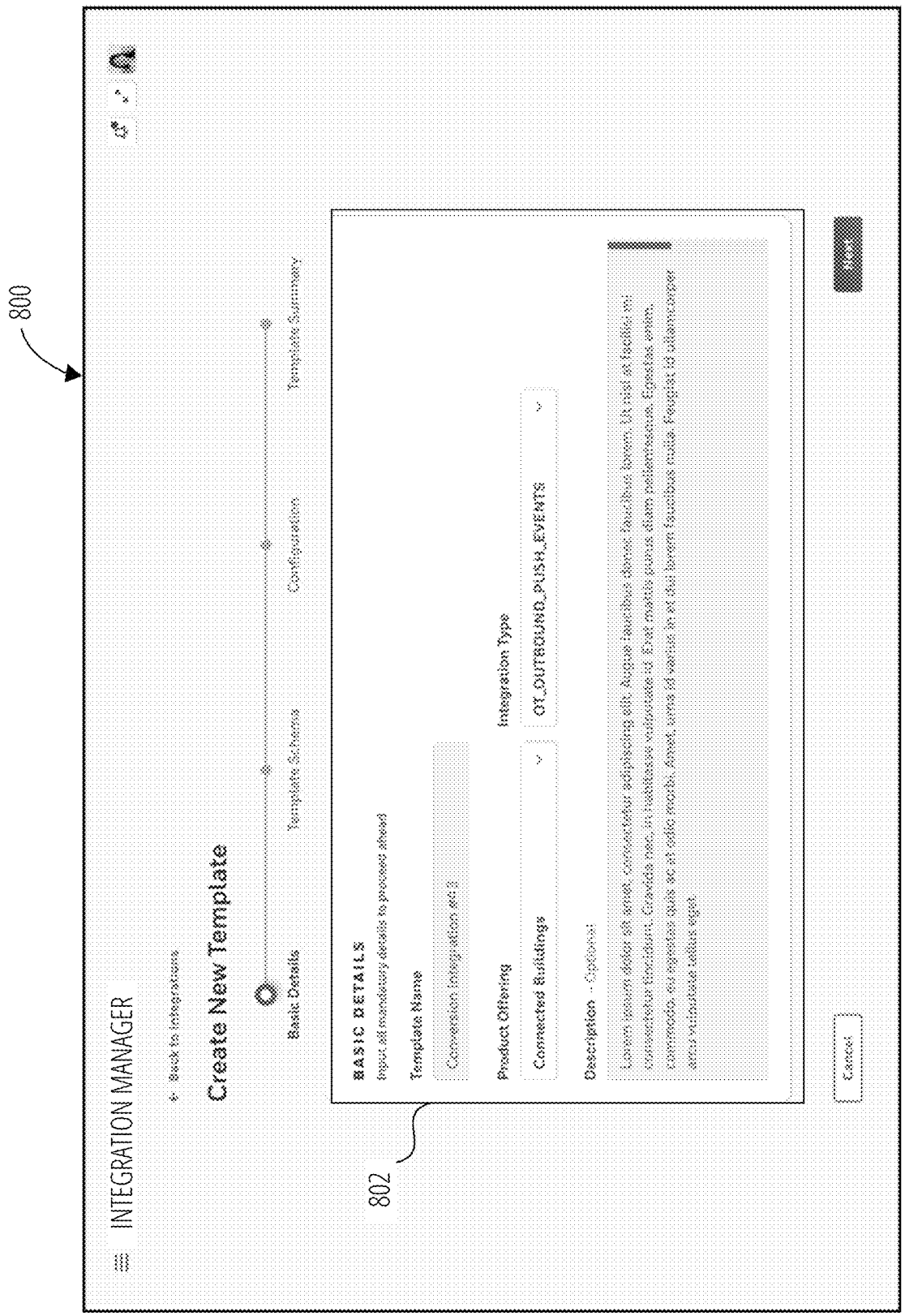
FIG. 8 illustrates an example user interface in accordance with at least one embodiment of the present disclosure.

FIG. 8 illustrates an example user interface in accordance with at least one embodiment of the present disclosure. Specifically, FIG. 8 depicts an example user interface 800. The user interface 800 embodies a user interface specially configured to begin generation of a new integration template via a templating system. In some embodiments, the apparatus 200 causes rendering of the user interface 800.

The user interface 800 includes template description sub-interface 802. In some embodiments, the template description sub-interface 802 includes one or more interface element(s) configured to receive template detail data to be associated with a new integration template. In some embodiments, the detail data includes metadata, identifier data, and/or the like that provide basic details associated with the new integration template. Non-limiting examples of the template detail data includes template name data, a template identifier, an associated product offering indicator, template integration type data, and template description data. In some embodiments, the template integration type data defines or otherwise uniquely identifies a particular type of integration template, where each type of integration template corresponds to particular required field(s) or parameter(s) that are required to be submitted to generate an integration template of that type. In some embodiments, the template detail data embodies a portion of template information to be associated with a newly generated integration template. It will be appreciated that the template description sub-interface 802 may include interface element(s) utilizes to input at least one data value corresponding to any data property utilized to classify, categorize, and/or otherwise identify a new integration template.

In some embodiments, the user interface 800 includes at least one interface element that cancels the process for generating the new integration template. Additionally or alternatively, in some embodiments, the user interface 800 includes at least one interface element that proceeds to a subsequent step in the process for generating the new integration template. In some embodiments, the user input causes transition or generation of a different user interface associated with the next step in the process for generation of the new integration template, for example the user interface 900 as depicted and described herein.

Figure 9:
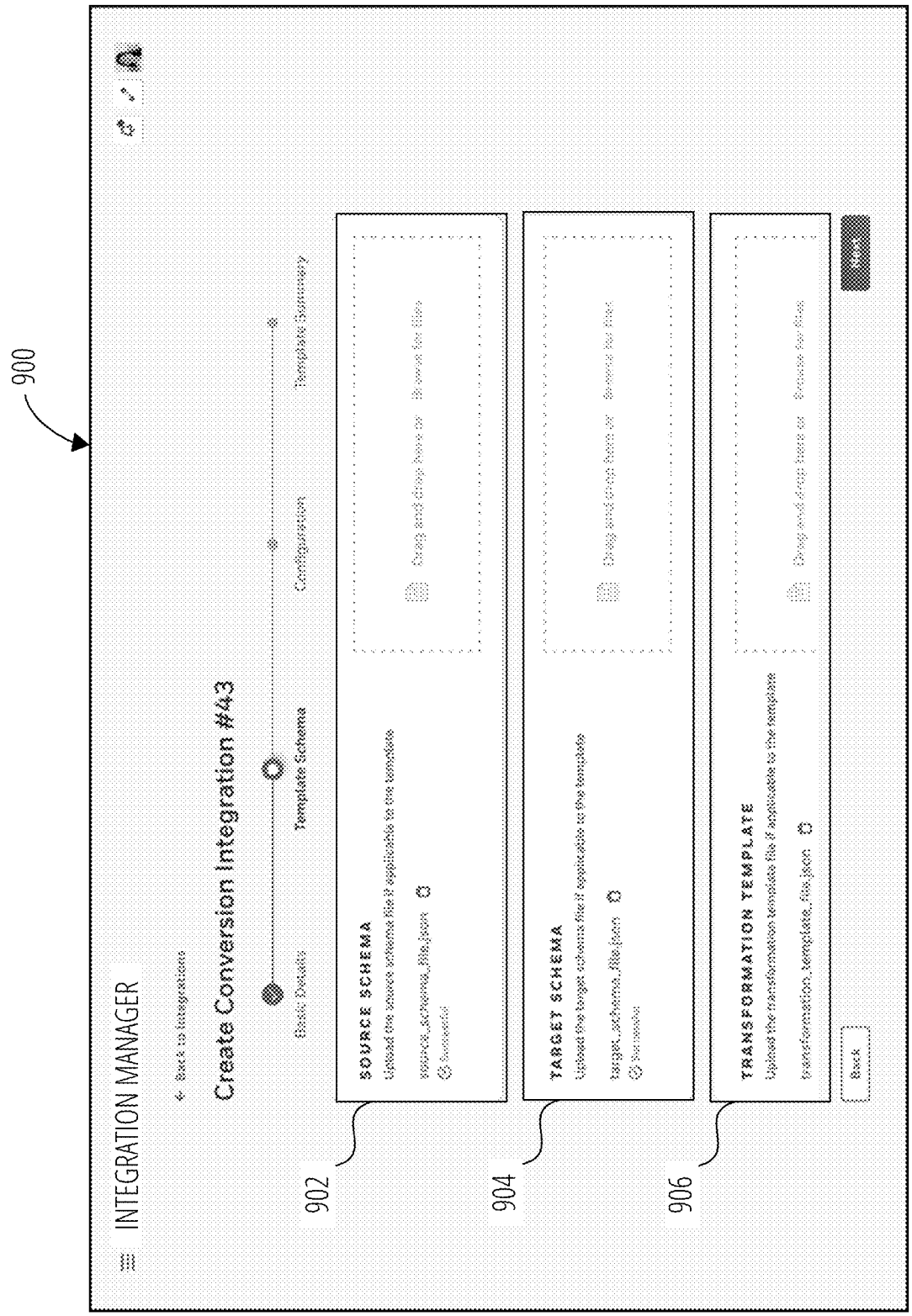
FIG. 9 illustrates an example user interface in accordance with at least one embodiment of the present disclosure.

FIG. 9 illustrates an example user interface in accordance with at least one embodiment of the present disclosure. Specifically, FIG. 9 depicts an example user interface 900. The user interface 900 embodies a user interface specially configured to receive particular template information associated with a new integration template via a templating system. In some embodiments, the apparatus 200 causes rendering of the user interface 900.

In some embodiments, the user interface 900 includes particular interface elements configured to enable inputting of particular template information utilized in defining data transformation(s) to be performed by integration instances instantiated based at least in part on the integration template. As illustrated, the user interface 900 includes a source schema input 902, a target schema input 904, and a template transformation input 906. In other embodiments, the user interface 900 may include one or more additional interface element(s) that enable inputting of other portion(s) of template information.

The source schema input 902 embodies or includes one or more interface element(s) configured to received source schema data. The source schema data defines a first schema associated with a data source from which data is to be transformed. For example, the source schema data in some embodiments defines a data object structure or organization including various data properties of source data. In some embodiments, the source schema data includes a JSON file, XML file, or other notation of data defining the structure of such data properties in the intended source schema.

In some embodiments, user input received via the source schema input 902 enables uploading and/or other inputting of the source schema data. For example, in some embodiments, the source schema input 902 is configured to receive one or more file(s) defining the source schema that are dragged and dropped onto the source schema input 902. Additionally or alternatively, in some embodiments, the source schema input 902 is configured to receive a user input and, in response to the user input, enables selection and/or uploading of a file or data object embodying the source schema data. The file or data object may be selected from the templating system, or a user device, that stores such a file and/or data object.

The target schema input 904 embodies or includes one or more interface element(s) configured to receive target schema data. The target schema data defines a second schema associated with a target data system and configuration to which data is to be transformed. For example, the target schema data in some embodiments defines a data object structure or organization including various data properties to which source data is to be transformed via one or more data transformation(s). In some embodiments, the target schema data includes a JSON file, XML file, or other notation of data defining the structure of such data properties in the desired target schema.

In some embodiments, user input received via the target schema input 904 enables uploading and/or other inputting of the target schema data. For example, in some embodiments, the target schema input 904 is configured to receive one or more file(s) defining the target schema that are dragged and dropped onto the target schema input 904. Additionally or alternatively, in some embodiments, the target schema input 904 is configured to receive a user input and, in response to the user input, enables selection and/or uploading of a file or data object embodying the target schema data. The file or data object may be selected from the templating system, or a user device, that stores such a file and/or data object.

The template transformation input 906 embodies or includes one or more interface element(s) configured to receive template transformation data. The template transformation input 906 embodies or includes one or more interface element(s) configured to receive template transformation data. The data transformation defines computer program instructions and/or computing logic that represents data transformations from source schema data to target schema data. For example, in some embodiments, the template transformation data includes a set of data transformations, each defined to link a data property of the source schema data to a data property of the target schema data, as well as perform one or more intermediary data transformation(s) that reformat, rearrange, or otherwise convert a value of the data property of the source schema data to a data value for the corresponding data property of the target schema data. In some embodiments, the template transformation data includes a JSON file, XML file, or other notation of data defining the data transformation(s) to be performed to convert at least a portion of the source schema data to a corresponding portion of the target schema data.

In some embodiments, the user interface 900 includes at least one interface element that cancels the process for generating the new integration template, and/or returns to a previous step of the process. Additionally or alternatively, in some embodiments, the user interface 900 includes at least one interface element that proceeds to a subsequent step in the process for generating the new integration template. In some embodiments, the user input causes transition or generation of a different user interface associated with the next step in the process for generation of the new integration template, for example the user interface 1000 as depicted and described herein.

Figure 10:
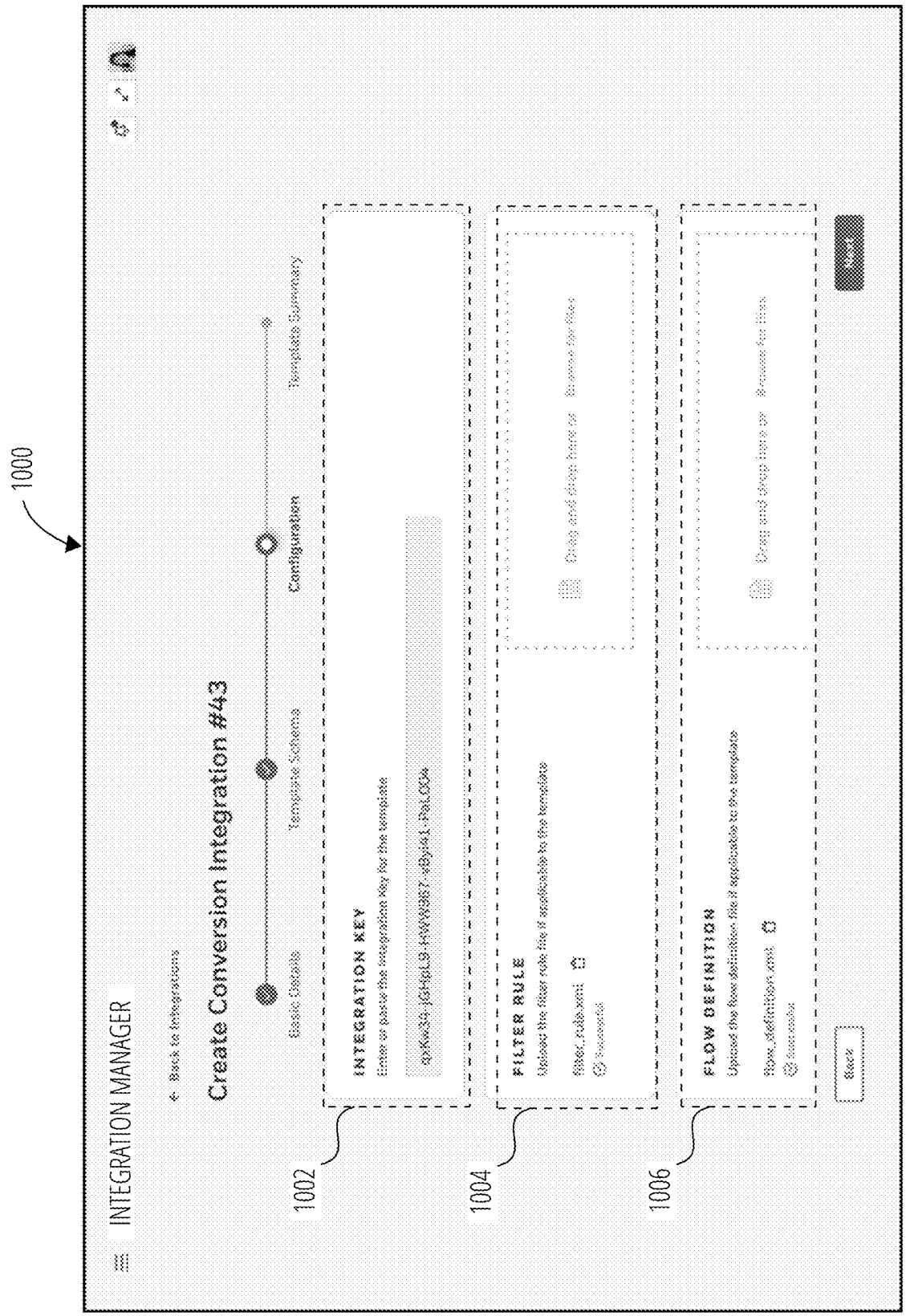
FIG. 10 illustrates an example user interface in accordance with at least one embodiment of the present disclosure.

FIG. 10 illustrates an example user interface in accordance with at least one embodiment of the present disclosure. Specifically, FIG. 10 depicts an example user interface 1000. The user interface 1000 embodies a user interface specially configured to receive additional and/or alternative template information associated with a new integration template via a templating system. In some embodiments, the apparatus 200 causes rendering of the user interface 1000. In some embodiments, the user interface 1000 includes particular interface element(s) configured to enable inputting of additional or optional data that further configures the new integration template. In some embodiments, rendering of the user interface 1000 is optional. For example, in some embodiments, transitions to the user interface 1000 instead immediately progress to the user interface corresponding to the next step in the process, for example user interface 1100 as depicted and described herein. Additionally or alternatively, in some embodiments, the user interface 1000 includes only some of the sub-interfaces depicted in the user interface 1000, for example only some of the integration key input 1002, filter rule input 1004, and/or flow definition input 1006.

The integration key input 1002 embodies or includes one or more interface element(s) configured to receive an integration key. In some embodiments, the integration key input 1002 includes one or more free text inputs that receives user input embodying an integration key. The integration key in some embodiments represents a custom, user inputted integration key unique to a particular integration template. Additionally or alternatively, in some embodiments the integration key input 1002 enables uploading or other selection of an integration key stored to or otherwise accessible to the templating system or an associated user device. In some embodiments, the user interface 1000 does not include the integration key input 1002, for example where the integration key is inputted via a corresponding client system upon initiation of a new integration instance.

The filter rule input 1004 embodies or includes one or more interface element(s) configured to receive a filter rule set. The filter rule set defines any number of filter rules utilized to filter one or more portions of data from a data transformation between the source schema data and the target schema data. In some embodiments, each filter rule embodies computing logic and/or computer-coded instructions that define a particular data filter. In some embodiments, the filter rule set is embodied within a JSON file, XML file, or other notation of data defining any number of filter rule(s).

In some embodiments, user input received via the filter rule input 1004 enables uploading and/or inputting of the filter rule set. For example, in some embodiments, the filter rule input 1004 is configured to receive one or more file(s) defining the filter rule set that are dragged and dropped onto the filter rule input 1004. Additionally or alternatively, in some embodiments, the filter rule input 1004 is configured to receive a user input and, in response to the user input, enables selection and/or uploading of a file or data object embodying the filter rule set. The file or data object may be selected from the templating system, or a user device, that stores such a file and/or data object.

The flow definition input 1006 embodies or includes one or more interface element(s) configured to receive a flow definitions set. The flow definitions set defines the query-based or instruction-based data movement between a first data source associated with the source schema data and a second data source associated with the target schema data. For example, in some embodiments, the flow definitions set defines data that embodies the transformation activities and/or order of such activities performed via data transformations to transform the source schema data to the target schema data. In some embodiments, the flow definitions set is embodied within a JSON file, XML file, or other notation of data defining any number of flow definition(s).

In some embodiments, user input received via the flow definition input 1006 enables uploading and/or other inputting of the flow definitions set. For example, in some embodiments, the flow definition input 1006 is configured to receive one or more file(s) defining the flow definitions set that are dragged and dropped onto the flow definition input 1006. Additionally or alternatively, in some embodiments, the flow definition input 1006 is configured to receive a user input and, in response to the user input, enables selection and/or uploading of a file or data object(s) embodying the flow definitions set. The file or data object may be selected from the templating system, or a user device, that stores such a file and/or data object.

In some embodiments, the user interface 1000 optionally includes at least one data interface configured to enable input of parameter override transformation data. For example, in some embodiments, the interface element(s) associated with the parameter override transformation data is/are configured to receive one or more file(s) defining the parameter override transformation data that are dragged and dropped onto the interface element(s). Additionally or alternatively, in some embodiments, the interface element(s) is/are configured to receive a user input and, in response to the user input, enables selection and/or uploading of a file or data object(s) embodying the parameter override transformation data. The file or data object may be selected from the templating system, or a user device, that stores such a file and/or data object. Alternatively or additionally, in some embodiments, the parameter override transformation data is defined by a client system at the time a particular integration instance is initiated.

In some embodiments, one or more of the integration key input 1002, filter rule input 1004, and/or flow definition input 1006 are optional. For example, in some embodiments the user interface 1000 does not include the integration key input 1002, for example where the integration key is inputted by a client system that initiated an integration instance based on an integration template. Alternatively or additionally, in some embodiments the user interface 1000 does not include one or more of the integration key input 1002 and/or filter rule input 1004.

In some embodiments, the user interface 1000 includes at least one interface element that cancels the process for generating the new integration template, and/or returns to a previous step of the process. Additionally or alternatively, in some embodiments, the user interface 1000 includes at least one interface element that proceeds to a subsequent step in the process for generating the new integration template. In some embodiments, the user input causes transition or generation of a different user interface associated with the next step in the process for generation of the new integration template, for example the user interface 1100 as depicted and described herein.

Figure 11:
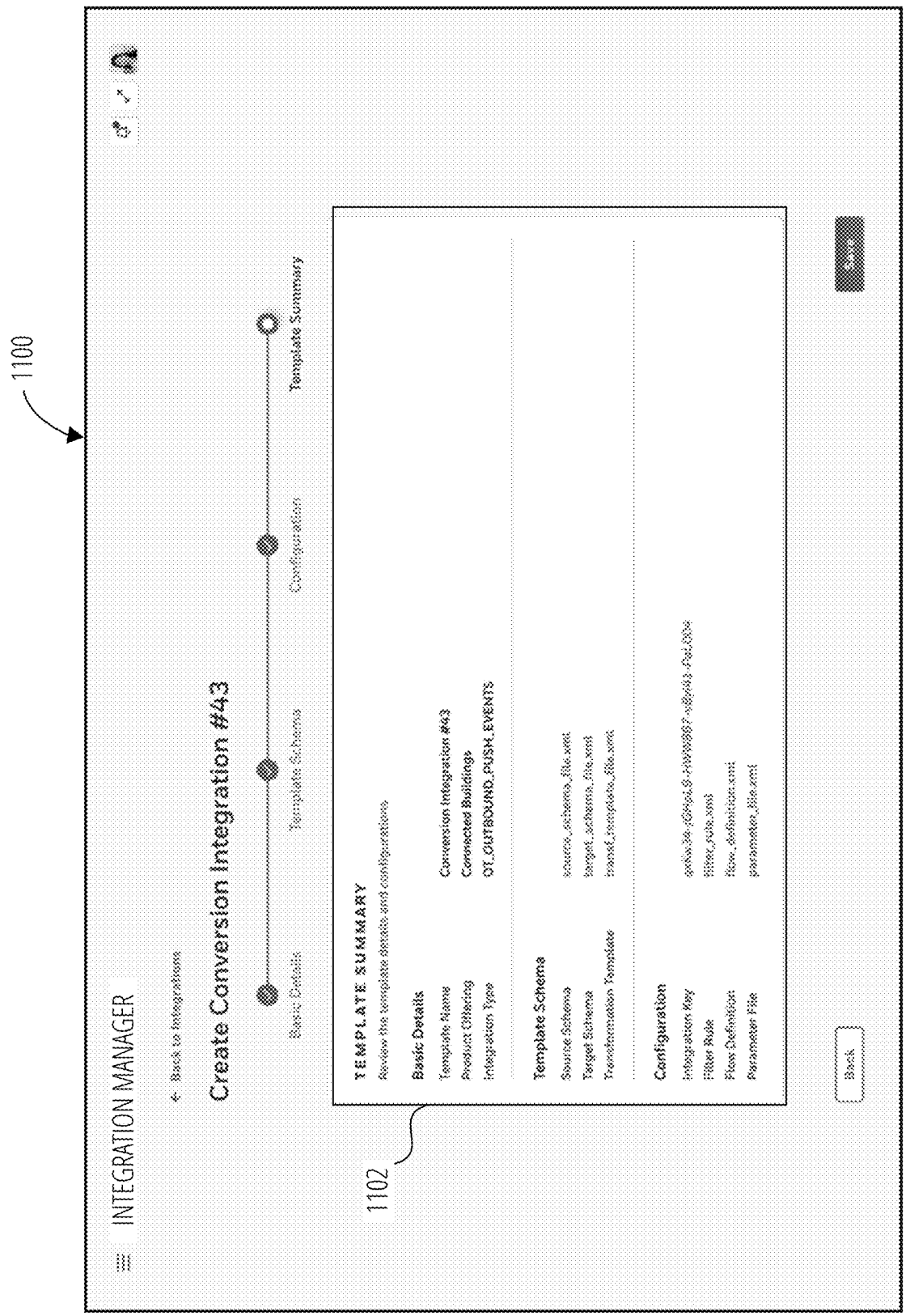
FIG. 11 illustrates an example user interface in accordance with at least one embodiment of the present disclosure.

FIG. 11 illustrates an example user interface in accordance with at least one embodiment of the present disclosure. Specifically, FIG. 11 depicts an example user interface 1100. The user interface 1100 embodies a user interface specially configured to depict a summary of details associated with an integration template being created. In some embodiments, the apparatus 200 causes rendering of the user interface 1100. In some embodiments, the user interface 1100 includes particular interface element(s) configured to enable displaying of particular data values and/or detail data associated with an integration template that a user (e.g., of the apparatus 200) is in the process of creating. In some embodiments, rendering of the user interface 1100 is optional. For example, in some embodiments, transitions to the user interface 1100 instead immediately progress to the user interface corresponding to the next step in the process, for example a confirmation screen indicating that the creation of a new integration template was successful or unsuccessful.

As illustrated, the user interface 1100 includes template summary sub-interface 1102. In some embodiments, the template summary sub-interface 1102 include(s) one or more interface element(s) that depicts data values for various properties of the new integration template being created. In some embodiments, such data values include data values inputted via the previously-accessed user interfaces, for example those as depicted and described with respect to user interface 700, user interface 800, user interface 900, and/or user interface 1000. In this regard, in some embodiments the template summary sub-interface 1102 depicts various basic details (e.g., metadata and/or template data not utilized in converting particular source schema data to particular target schema data), template schema data (e.g., depicting source schema data, target schema data, and/or template transformation data), and/or configuration data (e.g., a filter rule set, flow definitions set, parameter override transformation data), and/or the like. In this regard, a user may review the template summary sub-interface 1102 to determine that all such information is accurate as intended before finalizing, creating, and/or saving the new integration template for subsequent use. Upon initiating saving of the new integration template (e.g., via user input with a "save" button of the user interface 1100 and/or the like), the apparatus 200 may finalize the new integration template into a permanently stored data object embodying the integration template, for example stored to an integration template data repository maintained by or otherwise accessible to the apparatus 200.

In some embodiments, the user interface 1100 includes at least one interface element that cancels the process for generating the new integration template, and/or returns to a previous step of the process. Additionally or alternatively, in some embodiments, the user interface 1100 includes at least one interface element that proceeds to a subsequent step in the process for generating the new integration template. In some embodiments, the user input causes creation and/or saving of a new integration template based on the data inputted and/or selected in previous steps of the process, and/or causes transition or generation of a different user interface indicating whether creation of a new integration template was successful, for example the user interface 1100 as depicted and described herein.

Figure 12:
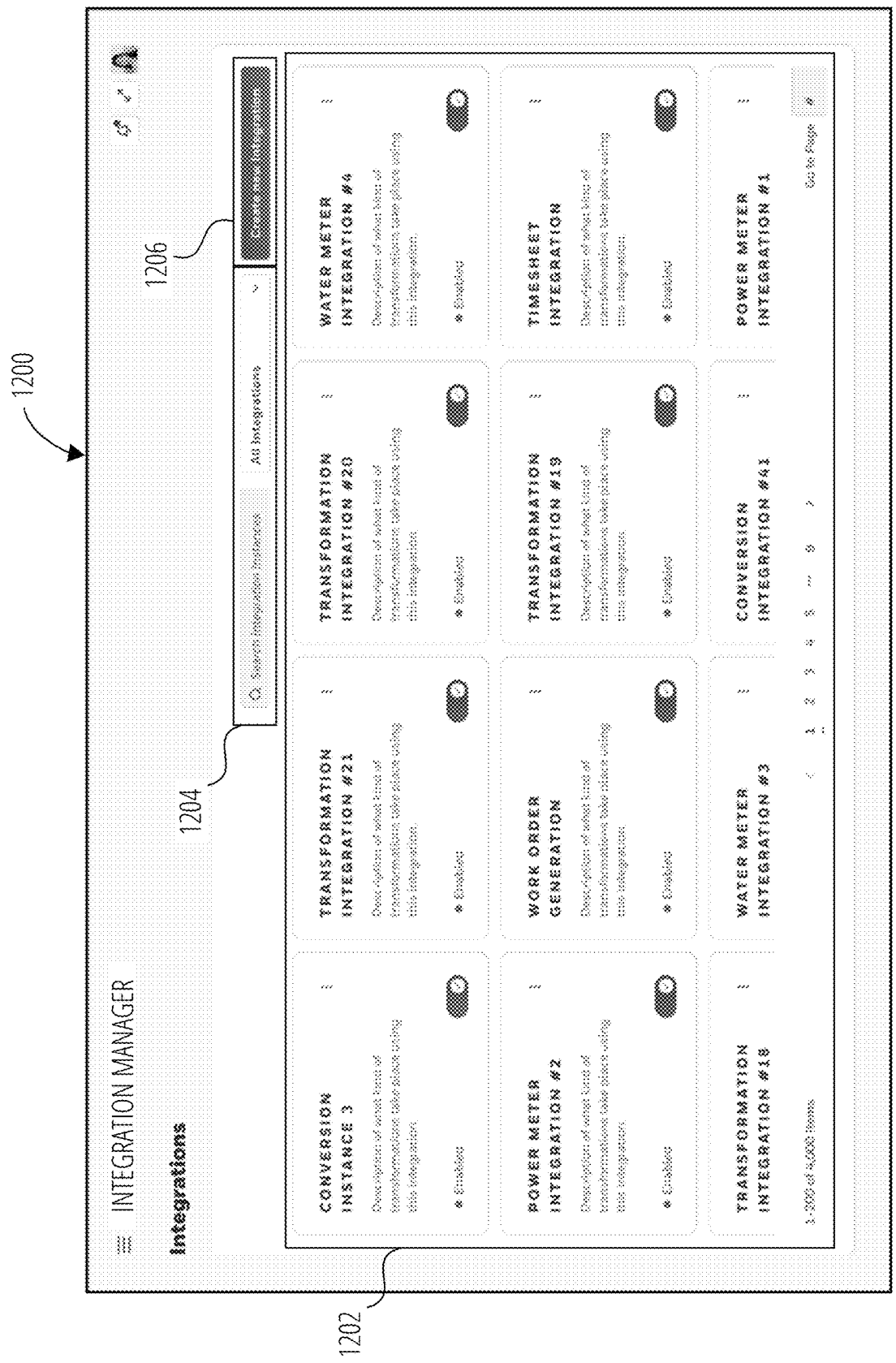
FIG. 12 illustrates an example user interface in accordance with at least one embodiment of the present disclosure.

FIG. 12 illustrates an example user interface in accordance with at least one embodiment of the present disclosure. Specifically, FIG. 12 depicts an example user interface 1200. The user interface 1200 embodies a user interface specially configured to enable viewing and/or searching of integrations and/or associated integration templates via a client system to initiate a new integration instance using a particular integration template, for example each integration and/or integration template is managed by a corresponding templating system accessible to the client system. In some embodiments, the apparatus 300 (e.g., embodying the client system) causes rendering of the user interface 1200.

The user interface 1200 includes an integration instance list sub-interface 1202. The integration instance list sub-interface 1202 includes a plurality of interface elements that each represent a different integration. Each integration may be associated with a corresponding integration template of one or more integration template(s) managed by a templating system, for example embodied by the apparatus 200. The integration instance list sub-interface 1202 is configured to receive user input that indicates a selection of a particular integration for viewing and/or configuring, or a selection of an integration instance such that the integration template corresponding to the selected integration instance is utilized to create a new integration instance. In some embodiments, the apparatus 300 maintains a data repository including each stored integration instance, and/or communicates with a templating system (e.g., embodied by the apparatus 200) that stores each integration instance, to retrieve the stored integration instances for rendering via the integration instance list sub-interface 1202.

The integration instance list sub-interface 1202 is configured to receive user input that indicates a selection of a particular integration from which a new integration template is to be generated. In this regard, the apparatus 300 receives data embodying the user input representing a selected integration instance, and from the selected integration instance identifies at least a portion of template information utilized in generating a new integration template. In some embodiments, the apparatus 200 maintains a data repository including each stored integration instance, and retrieves the stored integration instances for rendering via the integration instance list sub-interface 1202. Additionally or alternatively, in some embodiments, the integration instance list sub-interface 1202 includes one or more interface element(s) associated with each integration instance that enables toggling of the integration instance between an activated state and a deactivated state, such that a third-party device communications via the integration instance only in a circumstance where the integration instance is in an active state.

The user interface 1200 further includes an instance search sub-interface 1204. The instance search sub-interface 1204 includes one or more interface element(s) that enables searching through, filtering, and/or otherwise limiting the integration instances represented in the integration instance list sub-interface 1202. For example, the instance search sub-interface 1204 includes a search bar configured to receive free text in response to user input, where the free text is utilized to limit the integration instances depicted in the corresponding integration instance list sub-interface 1202. In some embodiments, the text inputted into the instance search sub-interface 1204 is utilized to determine integration instances that are determined relevant to the inputted text based at least in part on any one of a myriad of known searching algorithm(s). Additionally or alternatively, in some embodiments, the instance search sub-interface 1204 includes one or more interface element(s) that enable filtering the set of stored integration instances based at least in part on a user-selected value for any data property associated with an integration instance and/or integration template, for example based at least in part on selected value(s) for particular data properties of an integration instance or corresponding integration template of each integration instance associated with a particular client system.

Additionally, user interface 1200 includes new instance sub-interface 1206. In some embodiments, the new instance sub-interface 1206 includes one or more interface element(s) that enable a process for creation of a new integration instance. As depicted, the new instance sub-interface 1206 includes a button configured to receive user input, where the user input indicates a user request to begin a process for generation of a new integration instance. In some embodiments, the user input causes transition or generation of a different user interface associated with the process for generation of the new integration instance, for example the user interface 1300 as depicted and described herein.

Figure 13:
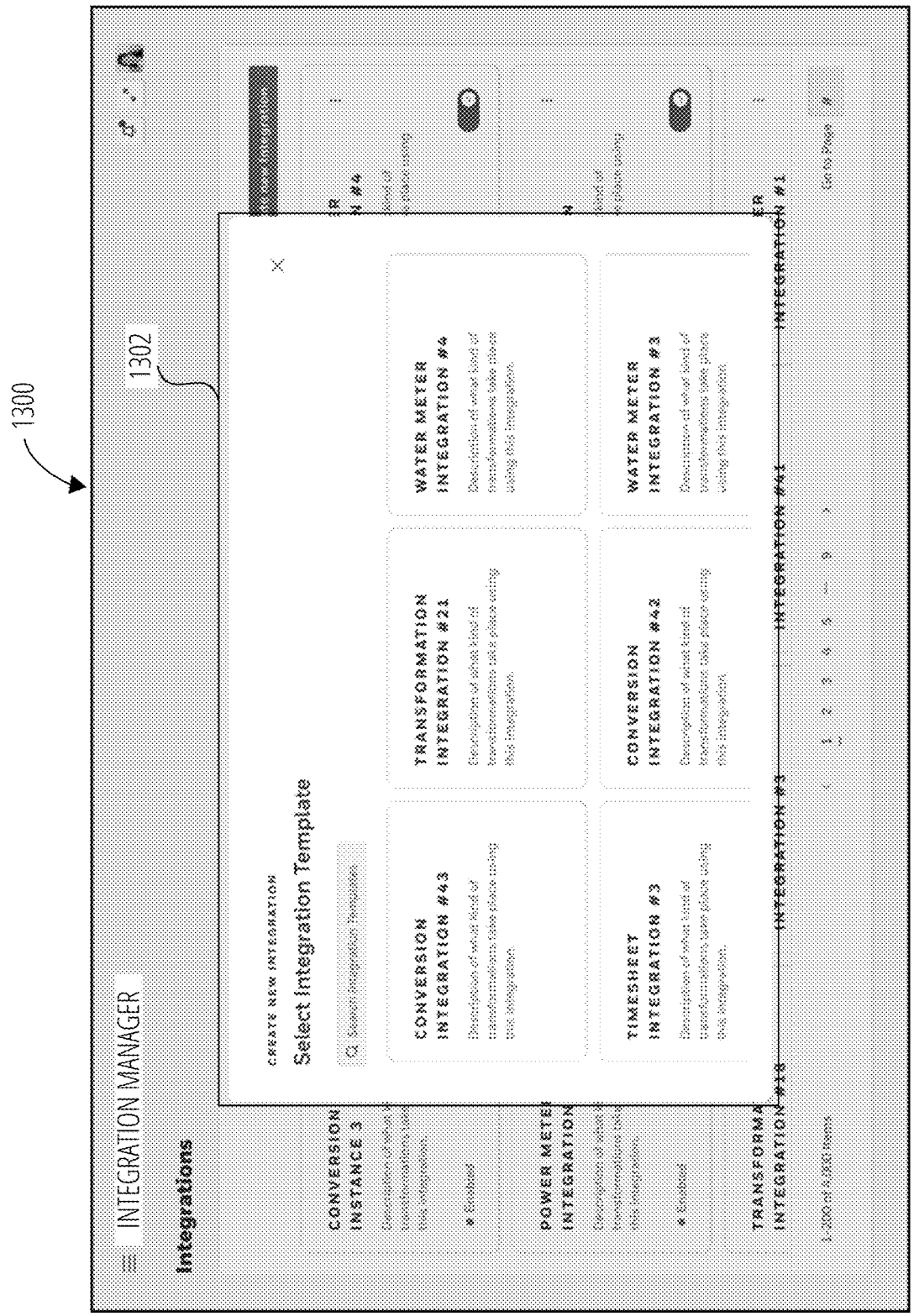
FIG. 13 illustrates an example user interface in accordance with at least one embodiment of the present disclosure.

FIG. 13 illustrates an example user interface in accordance with at least one embodiment of the present disclosure. Specifically, FIG. 13 depicts an example user interface 1300. The user interface 1300 embodies a user interface specially configured to enable viewing and/or searching of an integration template via a client system to initiate a new integration instance using the particular selected integration template, for example each integration template is managed by a corresponding templating system accessible to the client system. In some embodiments, the apparatus 300 (e.g., embodying the client system) causes rendering of the user interface 1300.

The user interface 1300 includes an instance creation sub-interface 1302. In some embodiments, the instance creation sub-interface 1302 is provided as a modal interface on top of the user interface 1200. Alternatively or additionally, in some embodiments, the instance creation sub-interface 1302 is provided as a separate interface transitioned to from the user interface 1200.

In some embodiments, the instance creation sub-interface 1302 is configured in a similar manner to the integration instance list sub-interface 1202 as depicted and described with respect to FIG. 12. In some such embodiments, the instance creation sub-interface 1302 may not include any interface element(s) for toggling activation and/or deactivation of any of the integration instance(s). In this regard, the instance creation sub-interface 1302 in some embodiments is configured to allow limited functionality including searching, filtering, and/or otherwise reducing the number of integration instance(s) rendered to the user interface 1300, and/or selecting a particular integration instance for use.

In some embodiments, the instance creation sub-interface 1302 is configured to receive user input that selects a particular integration instance and corresponding integration template. In some embodiments, the user input causes transition or generation of a different user interface associated with the process for generation of the new integration instance, for example the user interface 1400 as depicted and described herein. For example, in some embodiments, the instance creation sub-interface 1302 is configured to receive user input embodying a tap, touch, click, or other input on top of an interface element corresponding to an integration instance that the user has selected.

Figure 14:
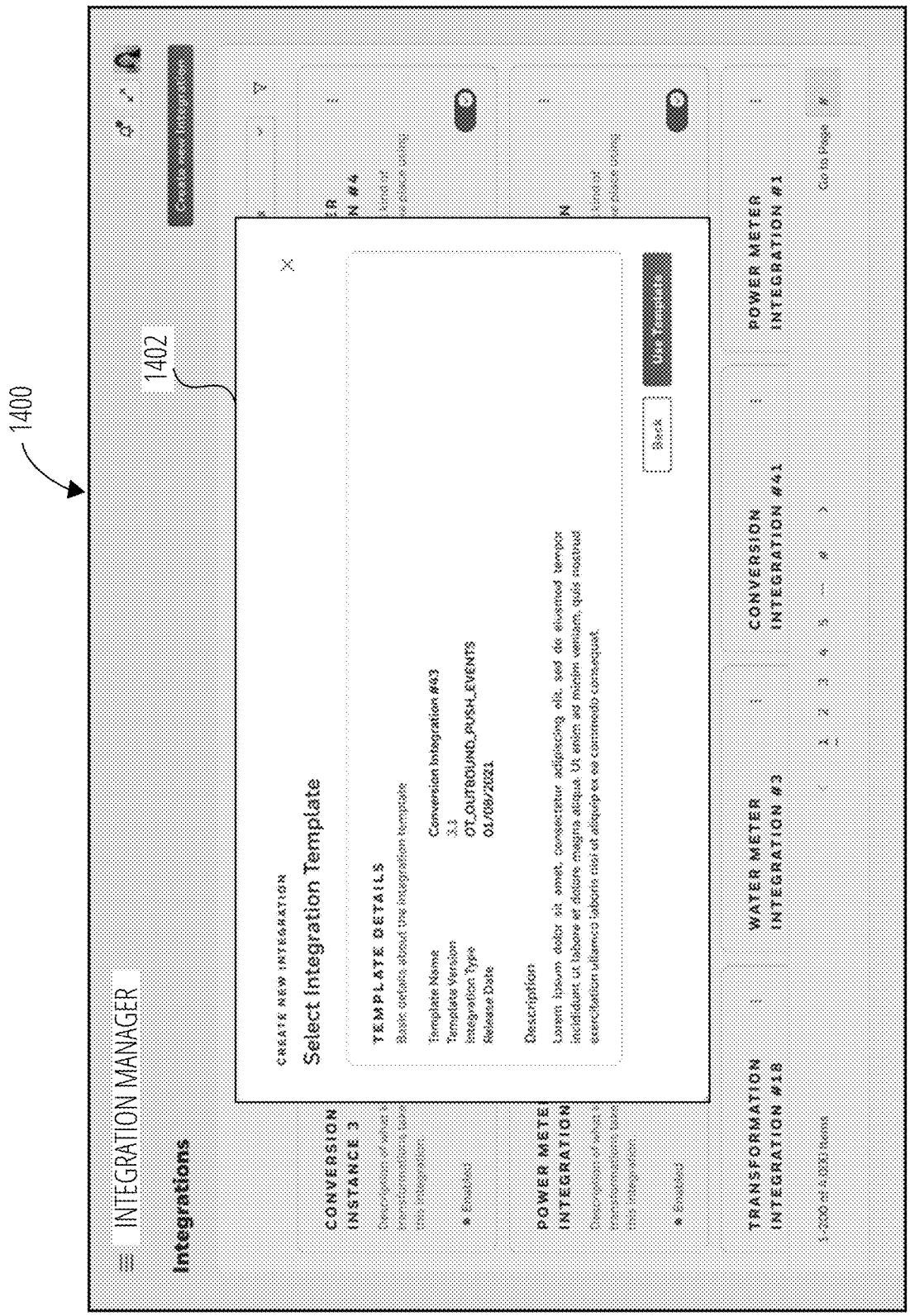
FIG. 14 illustrates an example user interface in accordance with at least one embodiment of the present disclosure.

FIG. 14 illustrates an example user interface in accordance with at least one embodiment of the present disclosure. Specifically, FIG. 14 depicts an example user interface 1400. The user interface 1400 embodies a user interface specially configured to enable viewing of details associated with an integration template corresponding to a particular selected integration instance. For example, in some embodiments, the user interface 1400 depicts particular information of or otherwise associated with an integration template selected via the user interface 1300. In some embodiments, the apparatus 300 (e.g., embodying the client system) causes rendering of the user interface 1400.

The user interface 1400 includes a selected template data sub-interface 1402. In some embodiments, the selected template data sub-interface 1402 is provided as a modal interface on top of the user interface 1200 and/or user interface 1300. Additionally or alternatively, in some embodiments, the selected template data sub-interface 1402 is provided as a separate interface transitioned to from the user interface 1300.

The selected template data sub-interface 1402 depicts various data values associated with particular data properties of template information associated with the selected integration template. For example, in some embodiments, the selected template data sub-interface 1402 is configured to include one or more interface element(s) that depict the data values for particular data properties of the selected integration template. As illustrated, the selected template data sub-interface 1402 depicts at least a template name value, a template version value, a template integration type value, a template release data value, and a template description value. The selected template data sub-interface 1402 may include any such data associated with a particular integration template that may be useful to an end user in determining whether to select a particular integration template for use in generating a new integration instance. In this regard, in some embodiments the selected template data sub-interface 1402 depicts one or more other portion(s) of template information associated with the selected integration template (e.g., corresponding to the selected integration instance via the user interface 1300).

In some embodiments, the user interface 1400 includes at least one interface element that cancels the process for generating the new integration instance, and/or returns to a previous step of the process, for example to the user interface 1300. Additionally or alternatively, in some embodiments, the user interface 1400 includes at least one interface element that proceeds to a subsequent step in the process for generating the new integration instance. In some embodiments, the user input initiates the process of creating a new integration instance based at least in part on the selected integration instance when the process was initiated (e.g., the selected integration template corresponding to the selected template data sub-interface 1402). For example, in some embodiments, the user input causes rendering of or transitioning to the user interface 1500 as depicted and described herein.

Figure 15A:
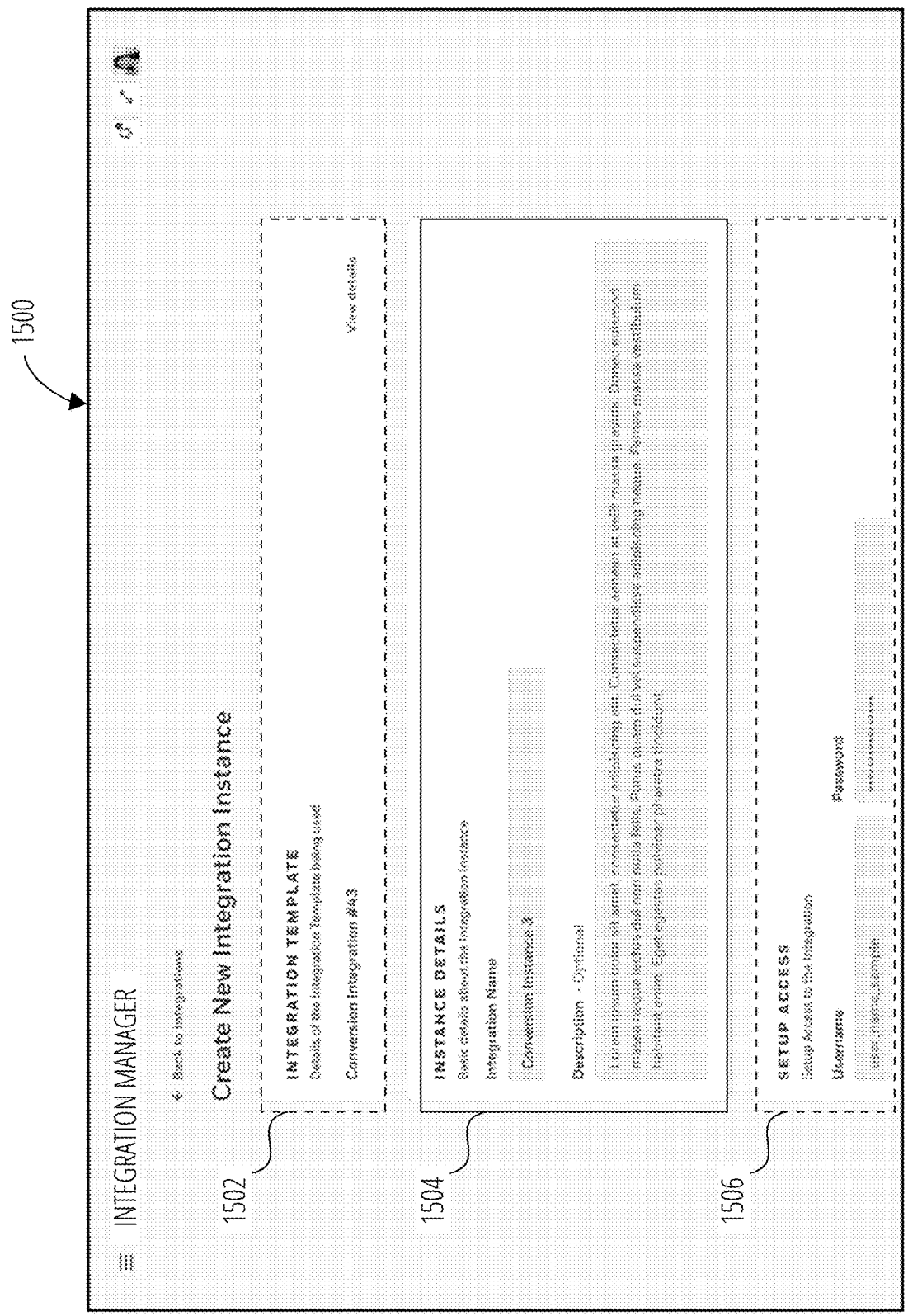
FIG. 15A illustrates an example user interface in accordance with at least one embodiment of the present disclosure.
Figure 15B:
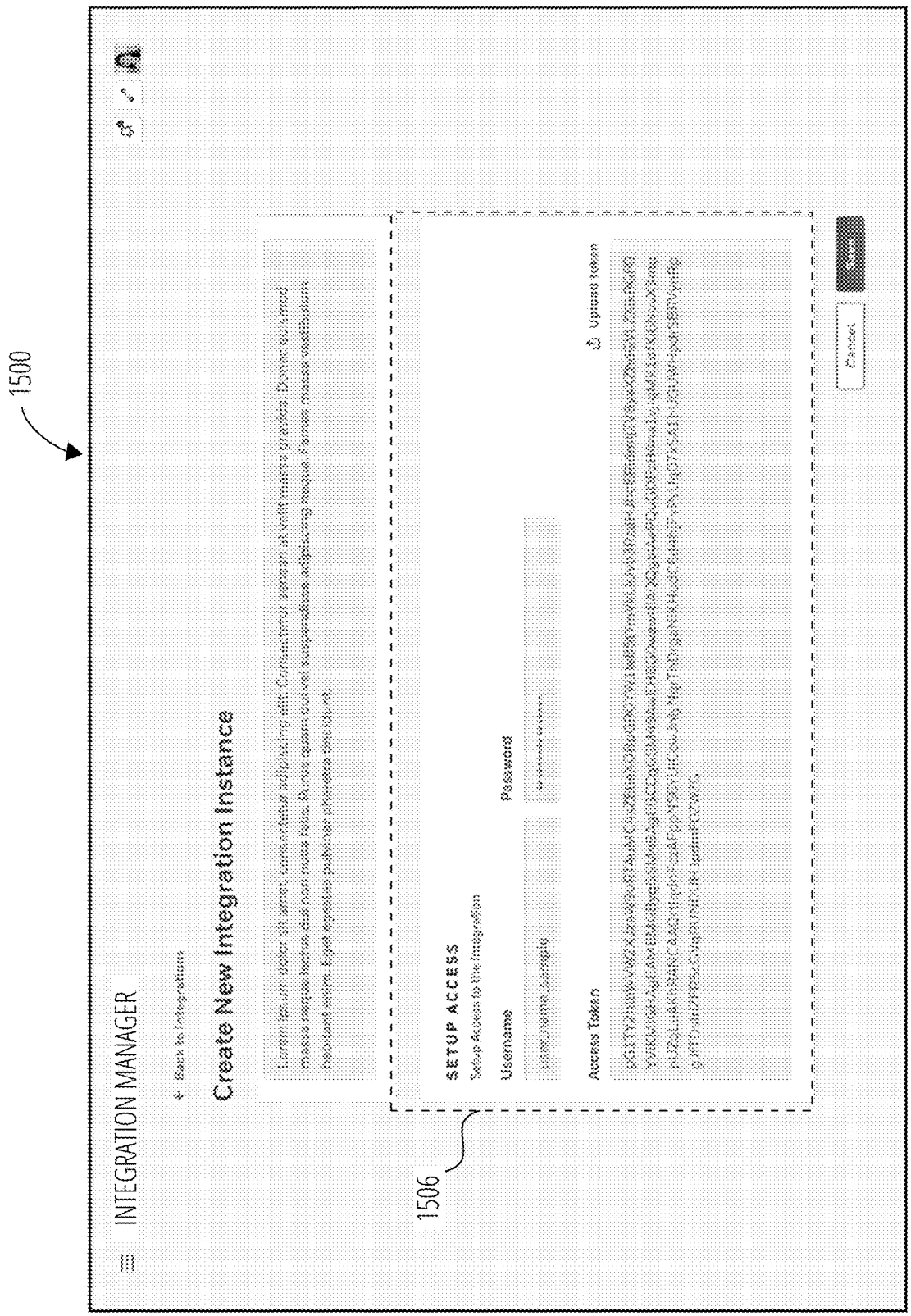
FIG. 15B illustrates an example user interface in accordance with at least one embodiment of the present disclosure.

FIG. 15A and FIG. 15B each illustrates an example user interface in accordance with at least one embodiment of the present disclosure. Specifically, FIG. 15A and FIG. 15B depict an example user interface 1500. The user interface 1500 embodies a user interface specially configured to receive additional and/or alternative instance information associated with a new integration instance for a particular client system via a corresponding templating system. In some embodiments, the apparatus 300 causes rendering of the user interface 1500.

In some embodiments, the user interface 1500 includes particular interface element(s) configured to enable inputting of additional or optional data that further configures the new integration instance. The user interface 1500 includes various sub-interfaces configured to enable input of instance information, including selected template indication sub-interface 1502, instance detail sub-interface 1504, and integration access sub-interface 1506. Such sub-interfaces include interface elements that are configured to receive and/or depict instance information for a particular new integration instance being created.

In some embodiments, the user interface 1500 includes a selected template indication sub-interface 1502. The selected template indication sub-interface 1502 includes one or more interface element(s) configured to indicate a selected integration template corresponding to the integration instance being created. For example, in some embodiments, the selected template indication sub-interface 1502 includes one or more interface element(s) that depict an integration template name, integration template identifier, and/or the like for the integration template selected for use in generating the new integration instance. Additionally or alternatively, in some embodiments, the selected template indication sub-interface 1502 includes one or more interface element(s) that enable depicting of template information, particular template detail data, and/or the like associated with the selected integration template. In some embodiments, the selected template indication sub-interface 1502 is optional, and details regarding the selected integration template need not be depicted in the user interface 1500.

Additionally or alternatively, in some embodiments, the user interface 1500 includes instance detail sub-interface

1504. The instance detail sub-interface 1504 includes one or more interface element(s) configured to receive instance detail data to be associated with a new integration instance being created. In some embodiments, the instance detail data includes metadata, identifier data, and/or the like associated with the new integration instance. Non-limiting examples of the instance detail data includes an integration instance name data, integration instance description data, and/or the like. In some embodiments, the instance detail data includes a portion of instance information to be associated with a newly generated integration instance. It will be appreciated that the selected template indication sub-interface 1502 may include any number of interface element(s) utilized to input at least one data value corresponding to any data property utilized to classify, categorize, identify, and/or otherwise describe a new integration instance.

Additionally or alternatively, in some embodiments, the user interface 1500 includes integration access sub-interface 1506. The integration access sub-interface 1506 includes one or more interface element(s) configured to receive integration access data that enables authorized communication via the integration instance. For example, in some embodiments, the integration access data comprises authentication credential(s), token(s), and/or other data that is verifiable before providing access to a particular API, data, method of communication, and/or the like that facilitates the integration. As depicted, the integration access sub-interface 1506 in some embodiments includes interface element(s) for inputting authentication credentials including a username and a password. In this regard, a user of the client system may input such a username and password pair that enables authentication of such credentials by a monitoring system, third-party system, and/or other external system to facilitate authenticated data communication associated with the integration instance being created. Additionally as depicted, the integration access sub-interface 1506 includes at least one interface element configured to receive an access token, for example where the access token further enables use authentication with the monitoring system, third-party system, and/or other external system that facilitates data communication associated with the integration instance. In some embodiments, such as where access credentials need not be set up for the integration instance, the integration access sub-interface 1506 is optional and not included.

In some embodiments, the user interface 1500 includes at least one interface element that cancels the process for generating the new integration instance, and/or returns to a previous step of the process. Additionally or alternatively, in some embodiments, the user interface 1500 includes at least one interface element that proceeds to a subsequent step in the process for generating the new integration instance. In some embodiments, the user input causes creation and/or saving of a new integration instance based on the data inputted and/or selected in previous steps of the process, for example by saving the new integration instance to a data repository maintained by the client system and/or associated templating system. Additionally or alternatively, in some embodiments, the user interface 1500 includes one or more interface element(s) that cause transition or generation of a different user interface indicating whether creation of a new integration instance was successful.

It should be appreciated that FIG. 15B depicts a continuation of the user interface 1500.

Figure 16:
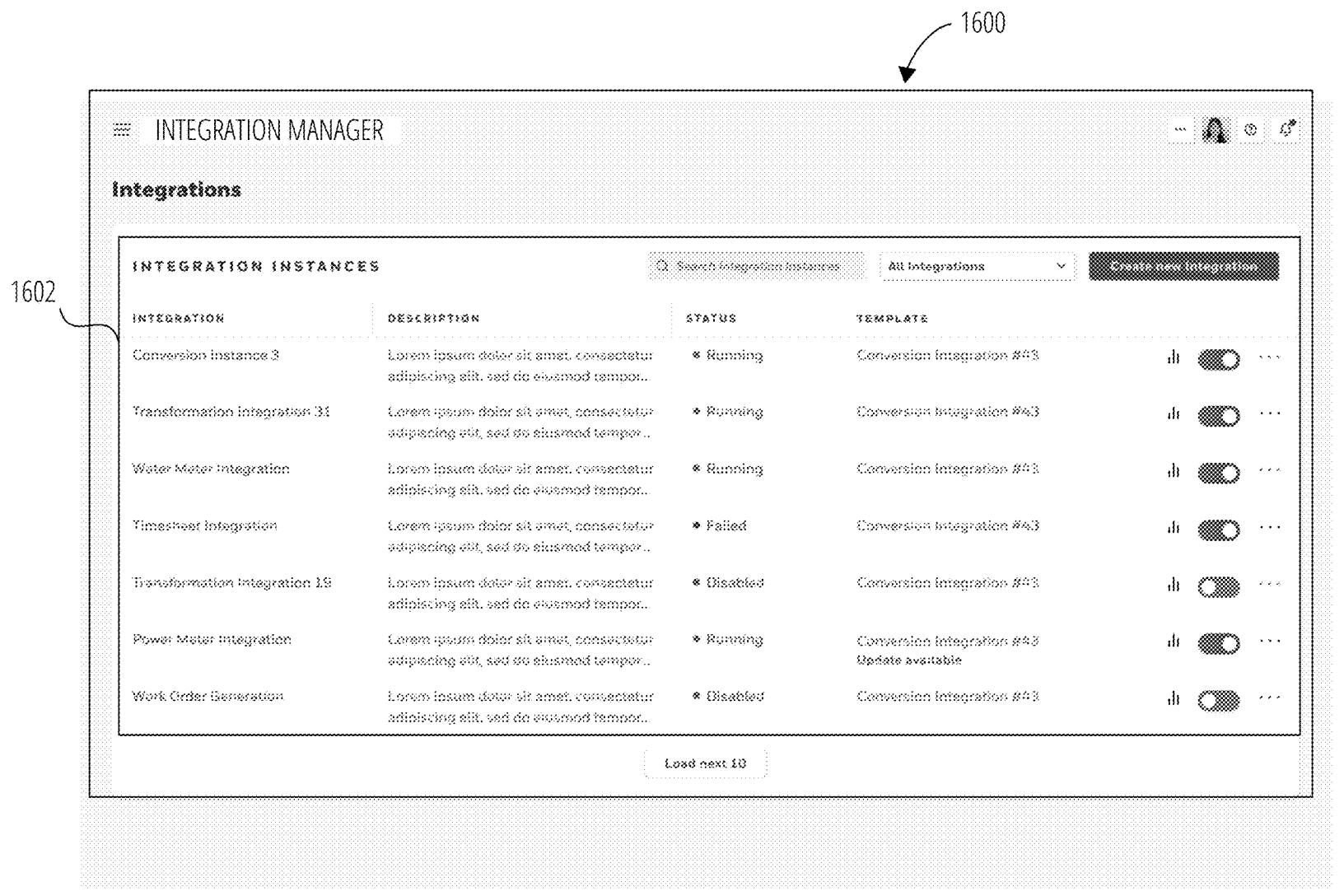

FIG. 16 illustrates an example user interface in accordance with at least one embodiment of the present disclosure. Specifically, FIG. 16 depicts an example user interface 1600. The user interface 1600 embodies a dashboard interface specially configured to provide indications of each integration instance associated with a particular client system, for example embodied by the apparatus 300 as depicted and described herein. In some embodiments, the apparatus 300 causes rendering of the user interface 1600.

In some embodiments, the apparatus 300 retrieves and/or otherwise identifies a set of integration instances associated with a particular client system. In some embodiments, the set of integration instances is retrieved using one or more queries to at least one data repository maintained by the apparatus 300 or a corresponding templating system (e.g., embodied by the apparatus 200) for such integration instances. For example, in some embodiments the query is performed based at least in part on an identifier corresponding to the client system and/or associated user for which the user interface 1600 is to be rendered, as identified from the apparatus 300 or based on authenticated user credentials for accessing the templating system, for example.

The user interface 1600 includes a dashboard 1602. The dashboard 1602 includes an arrangement of interface elements, each interface element corresponding to a particular integration instance associated with a client system. For example, in some embodiments, the dashboard 1602 includes a table that includes a row for each different integration instance, and a plurality of columns that each represent a data value for a different data property associated with the particular integration instance represented in the row. As depicted, each row of the dashboard 1602 includes a column representing an integration instance name, a column representing an integration instance description, a column representing an integration instance status, and a column representing an integration template name and/or identifier associated with the integration template corresponding to the integration instance. Additionally or alternatively, in some embodiments, each row includes one or more interface element(s) that enables accessing additional actions and/or information associated with the integration instance corresponding to that row. For example, each row of the dashboard 1602 additionally includes a column including an interface element for accessing an activity log associated with the integration instance, a column including an interface element that enables toggling of activation of the integration instance (e.g., from an active state to a deactivated state, or from a deactivated state to an activate state), and a column including an interface element that enables access to one or more other action(s) associated with the corresponding integration instance (e.g., deletion of the integration instance, duplication of a the integration instance to a new and separately-configurable integration instance, checking for available updates to a corresponding integration template, and/or the like).

In some embodiments, the dashboard 1602 is configured to enable user input that interacts with each integration instance depicted via the dashboard 1602. For example, in some embodiments, one or more of the columns of the dashboard 1602 is configured so that, in response to user input with that column, particular corresponding user interface(s) is/are rendered that depict particular instance information, enable reconfiguration of a particular interface element and/or corresponding integration template, and/or the like. For example, in some embodiments, the first column of the dashboard 1602 including the integration instance name is configured such that, upon user input with a particular row within the first column, a user interface including a summary of the instance information corresponding to the integration instance is rendered.

Additionally or alternatively, in some embodiments, the dashboard 1602 includes one or more interface element(s) configured to enable searching, filtering, and/or other limiting of the integration instances that are rendered via the dashboard 1602. For example, in some embodiments, the dashboard 1602 includes a search bar and/or other filtering interface element(s) that are configured in a similar manner to the search and filtering components depicted and described with respect to FIG. 12, for example. Additionally or alternatively, in some embodiments, the dashboard 1602 includes at least one interface element that is configured to, in response to user input, begin a process for generating a new integration instance associated with the client system. For example, in some embodiments, the dashboard 1602 includes a button to create a new integration instance, which upon engagement via user input generates and/or transitions to the user interface 1300 as depicted and described herein.

Figure 17:
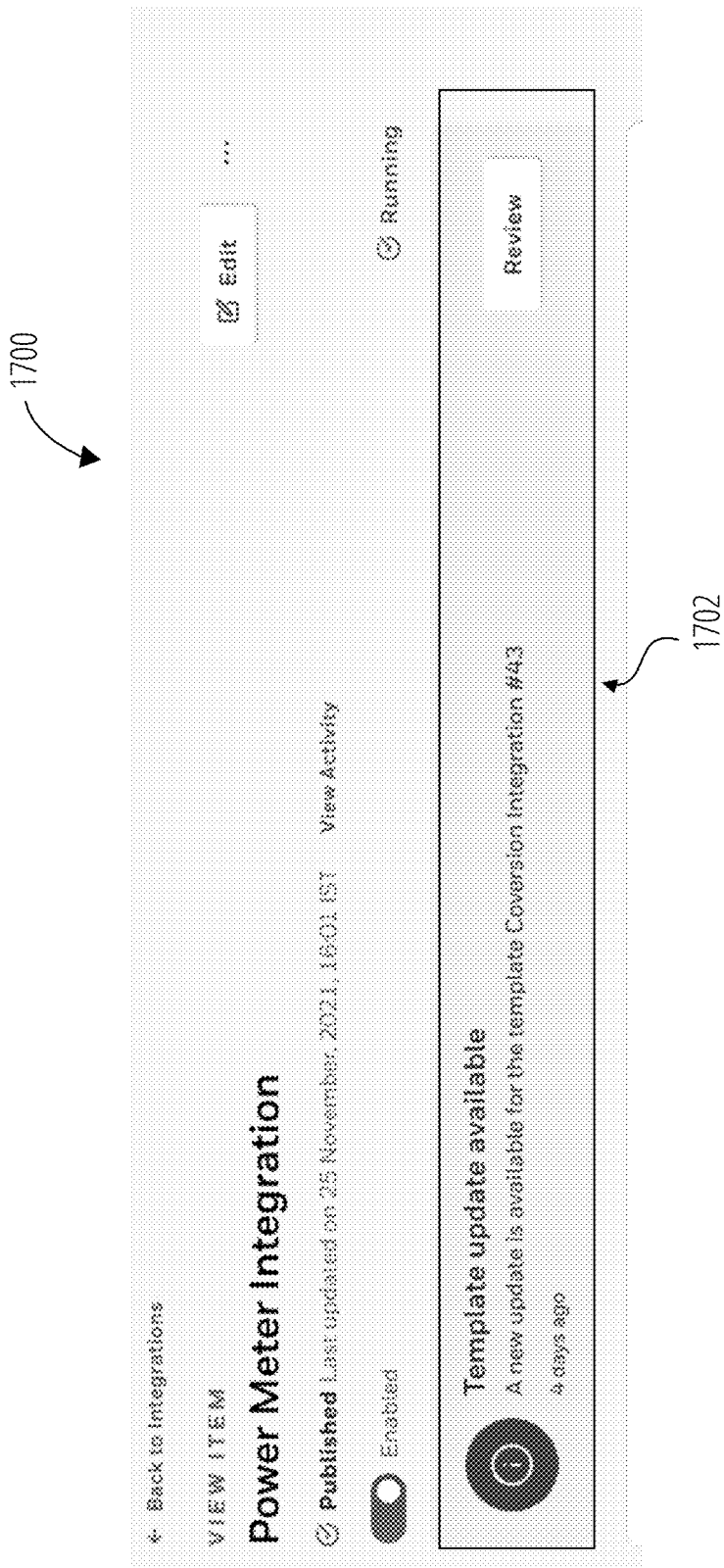
FIG. 17 illustrates an example user interface in accordance with at least one embodiment of the present disclosure.

FIG. 17 illustrates an example user interface in accordance with at least one embodiment of the present disclosure. Specifically, FIG. 17 depicts an example user interface 1700. The user interface 1700 embodies a dashboard interface specially configured to depict an available update associated with an integration template corresponding to a particular integration instance. In some embodiments, the apparatus 300 causes rendering of the user interface 1700. In some embodiments, the user interface 1700 is renderable as a standalone user interface. Additionally or alternatively, in some embodiments, the user interface 1700 is renderable as a sub-interface of another user interface as depicted and described herein, for example as a sub-interface of the user interface 1600 or dashboard 1602 thereof.

In some embodiments, the user interface 1700 is specially configured based at least in part on a selected integration instance. In some embodiments, the integration instance is selected via user input with another user interface, for example via user input with one of the rows of the dashboard 1602 as depicted and described herein. In this regard, the user interface 1700 may include particular data corresponding to the selected integration instance. For example, in some embodiments, the user interface 1700 includes one or more interface element(s) indicating whether the selected integration instance is in an active state or a deactivated state, whether the selected integration instance is running normally, experiencing an error, and/or in another functional status. Additionally or alternatively, in some embodiments, the user interface 1700 includes one or more interface element(s) that are configured to enable, in response to user input, editing of the integration instance and/or an integration template corresponding to the selected integration instance.

The user interface 1700 further includes a notification 1702. As depicted, the notification 1702 embodies an update notification including information indicating that an available update is retrievable for the integration template corresponding to the selected integration instance. In some embodiments, a determination of whether a particular integration template has an available update is performed by a templating system, for example by determining whether the integration template is associated with an updated version, whether one or more change(s) in the configuration of the integration template have been performed since instantiation of the integration instance or since a previous push of an available update, and/or via any other data-driven determination by the templating system and/or client system. In some embodiments, an update is made to the integration template by an administrator of the templating system, by one of the client system(s) that have an integration instance based on the integration template, and/or the like. In this regard, the integration template utilized to instantiate a particular integration instance may embody a particular version of the integration template at the time that the integration instance is initiated, and subsequent versions of the integration template may be created and stored by the templating system at subsequent times as one or more data properties of the integration template is/are updated, for example updates to template information thereof. In some embodiments, the client system determines, and/or prompts a templating system to determine, whether an available update exists for a particular selected integration instance upon selection of the integration instance, for example by transmitting a specially configured request to prompt such a determination.

The notification 1702 may include any number of interface element(s) that indicate whether an available update exists, information regarding the available update, enable retrieval of the available update, and/or the like. For example, in some embodiments, the notification 1702 includes one or more text label(s), image(s), and/or the like that include text and/or visual data indicating that an available update exists for the corresponding integration template. Additionally or alternatively, in some embodiments, the notification 1702 includes one or more text label(s), image(s), and/or the like that include text and/or visual data indicating a time at which the integration template was updated and/or that the available update became available. Additionally or alternatively, in some embodiments, the notification 1702 includes one or more button(s) that, upon receiving user input, initiate updating of the integration template corresponding to the selected integration instance based on the available update. For example, in some embodiments the user input causes generation and/or transmission of an update request that prompts transmission of the available update to the client system, where the available update is utilized to update the data properties of the integration template to reflect updated information. In this regard, the update request may cause the templating system (or another system storing the integration template) to transmit the updated information to the client system in response, and cause the client system to update the integration template of the integration instance accordingly based at least in part on the updated information.

FIG. 18 illustrates an example user interface in accordance with at least one embodiment of the present disclosure. Specifically, FIG. 18 depicts an example user interface 1800. In some embodiments, the user interface 1800 is rendered as a separate and/or standalone user interface. In some embodiments, the apparatus 300 causes rendering of the user interface 1800. In some embodiments, the user interface 1800 is renderable as a standalone user interface. Additionally or alternatively, in some embodiments, the user interface 1700 is renderable as a sub-interface of another user interface as depicted and described herein, for example as a sub-interface of the user interface 1600 or dashboard 1602 thereof.

In some embodiments, the user interface 1800 is specially configured based at least in part on a selected integration instance. In some embodiments, the integration instance is selected via user input with another user interface, for example via user input with one of the rows of the dashboard 1602 as depicted and described herein. In this regard, the user interface 1800 may include particular data corresponding to the selected integration instance. For example, in some embodiments, the user interface 1800 includes interface element(s) indicating particular action(s) performed with respect to a particular integration instance.

As illustrated, the user interface 1800 includes activity log list sub-interface 1802. The activity log list sub-interface 1802 includes any number of interface element(s), each depicting data associated with particular actions previously performed with respect to a particular integration instance. Actions performed with respect to a particular integration instance may include any process, data input, change, or other update performed with respect to a particular integration element. In some embodiments, such actions include processes, data inputs, changes, and/or other updates with respect to an integration template corresponding to the selected integration instance, for example embodying updates to the integration template based on updated information.

As depicted, the activity log list sub-interface 1802 includes a row corresponding to each action performed with respect to the selected integration instance. Each row further includes a column corresponding to a user that performed or otherwise caused a particular action, timestamp data at which the action was performed or initiated, and action description data that provides a human-readable description of the action represented in the row. In some embodiments, the client system and/or templating system maintains the integration action log, such that a new data record or object is stored to a particular data repository, file, and/or the like embodying the integration action log upon performance of the action.

Example Processes of the Disclosure

Having described example systems and apparatuses, data visualizations, and user interfaces in accordance with the disclosure, example processes of the disclosure will now be discussed. It will be appreciated that each of the flowcharts depicts an example computer-implemented process that is performable by one or more of the apparatuses, systems, devices, and/or computer program products described herein, for example utilizing one or more of the specially configured components thereof.

Although the example processes depicts a particular sequence of operations, the sequence may be altered without departing from the scope of the present disclosure. For example, some of the operations depicted may be performed in parallel or in a different sequence that does not materially affect the function of the processes.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

Figure 19:
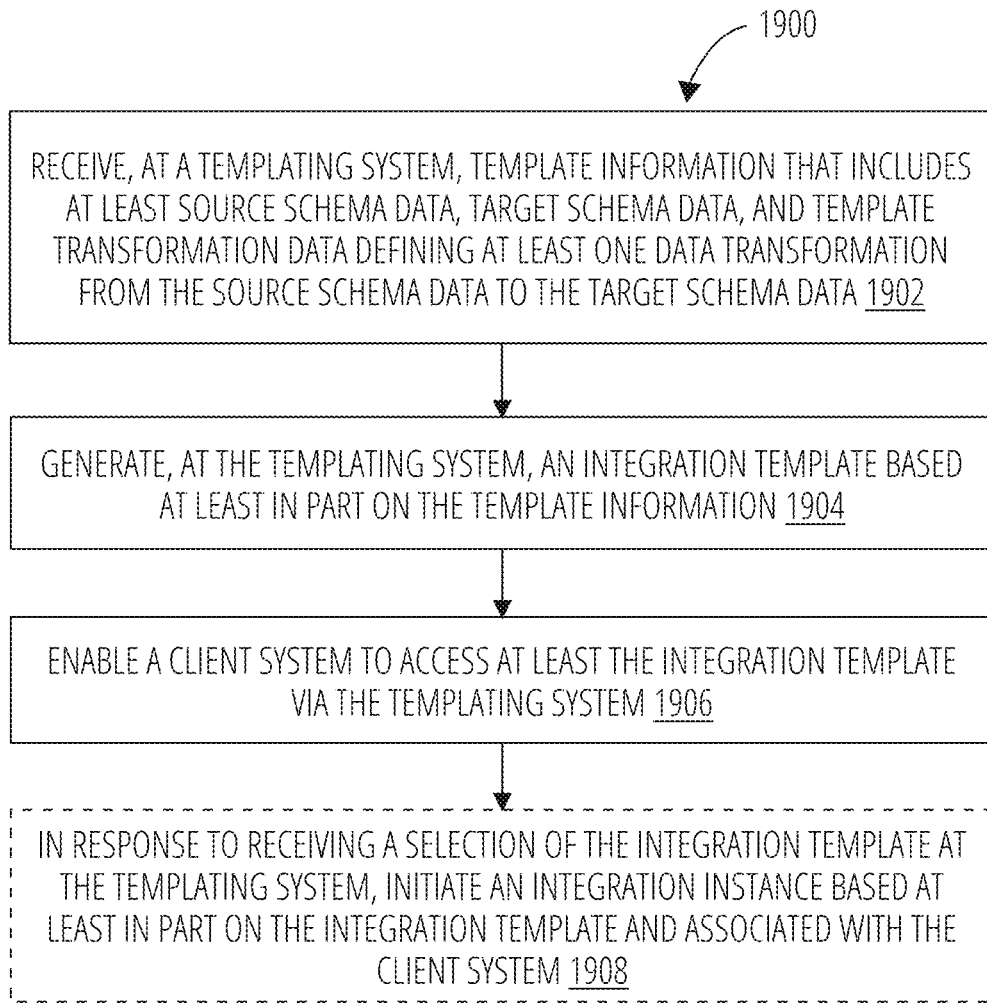
FIG. 19 illustrates a flowchart depicting example operations of an example process for generating an integration template from a first perspective, in accordance with at least one embodiment of the present disclosure.

FIG. 19 illustrates a flowchart depicting example operations of an example process for generating an integration template from a first perspective, in accordance with at least one embodiment of the present disclosure. Specifically, FIG. 19 depicts an example process 1900. In some embodiments, the process 1900 is embodied by computer program code stored on a non-transitory computer-readable storage medium of a computer program product configured for execution to perform the process as depicted and described. Alternatively or additionally, in some embodiments, the process 1900 is performed by one or more specially configured computing devices, such as the apparatus 200 alone or in communication with one or more other component(s), device(s), system(s), and/or the like. In this regard, in some such embodiments, the apparatus 200 is specially configured by computer-coded instructions (e.g., computer program instructions) stored thereon, for example in the memory 204 and/or another component depicted and/or described herein and/or otherwise accessible to the apparatus 200, for performing the operations as depicted and described. In some embodiments, the apparatus 200 is in communication with one or more external apparatus(es), system(s), device(s), and/or the like, to perform one or more of the operations as depicted and described. For example, the apparatus 200 in some embodiments is in communication with at least one external data repository, client system, and/or the like, to perform one or more of the operation(s) as depicted and described. For purposes of simplifying the description, the process 1900 is described as performed by and from the perspective of the apparatus 200.

Although the example process 1900 depicts a particular sequence of operations, the sequence may be altered without departing from the scope of the present disclosure. For example, some of the operations depicted may be performed in parallel or in a different sequence that does not materially affect the function of the process 1900. In other examples, different components of an example device or system that implements the process 1900 may perform functions at substantially the same time or in a specific sequence.

According to some examples, the method includes receiving, at a templating system, template information at operation 1902. In some embodiments, the template information includes at least source schema data, target schema data, and template transformation data defining at least one data transformation from the source schema data to the target schema data. In some embodiments, the apparatus 200 receives additional and/or alternative template information, for example integration access data, template detail data, and/or the like.

In some embodiments, the apparatus 200 embodying the templating system receives the template information from a client system. For example, in some embodiments the apparatus 200 receives some or all of the template information from a client system in response to user input indicating, uploading, or otherwise representing the template information. For example, in some embodiments the user interacts with a particular user interface via the client system, for example embodied by the apparatus 300, to provide user input embodying or indicating each of the target schema data, source schema data, and/or template transformation data.

Additionally or alternatively, in some embodiments, the apparatus 200 receives a stored portion of the template information. For example, the apparatus 200 in some embodiments retrieves stored target schema data in a circumstance where the integration template is intended for use with integrations that enable communication of data to a particular data target that utilizes a particular, fixed target schema. Additionally or alternatively, for example, the apparatus 200 in some embodiments retrieves stored source schema data in a circumstance where the integration template is intended for use with integrations that enable communication of data from a particular data source that utilizes a particular, fixed source schema, or to a particular target. In some embodiments, a client system is provided access to one of the source schema data or the target schema data, but not both, such that particular schema data may be inputted for whichever schema is not fixed.

According to some examples, the method includes generating, at the templating system, an integration template at operation 1904. In some embodiments, the apparatus 200 generates a new integration template based at least in part on the template information. In some embodiments, the apparatus 200 generates the integration template by configuring a new integration template that utilizes the received template information. In this regard, the new integration template is configured to enable instantiation of an integration instance based at least in part on the integration template, where the integration template enables the new integration instance to perform data communications between a third-party device and a monitoring system (e.g., embodied by the templating system and/or a separate monitoring system) utilizing data transformations supported by the template information of the integration template. In some embodiments, the apparatus 200 generates and/or stores one or more data record(s), one or more data object(s), and/or the like that embody the integration template. In some embodiments, the apparatus 200 stores the integration template in at least one data repository maintained by or otherwise accessible to the apparatus 200.

According to some examples, the method includes enabling a client system to access at least the integration template via the templating system at operation 1906. In some embodiments, the apparatus 200 is configured to retrieve integration templates stored via the apparatus 200 and provide the client system with such integration templates to enable the client system to browse and select from the available integration templates. Additionally or alternatively, in some embodiments, the apparatus 200 is configured to receive and process search queries submitted by a client system, and provide access to integration templates that are retrieved from resolution of the search query. In some embodiments, the client system communicates with the apparatus 200 to cause rendering of a particular user interface that enables selection of the integration template, for example as depicted and described with respect to FIG. 7 and FIG. 8 herein.

According to some examples, the method optionally includes receiving a selection of the integration template at the templating system, and in response, initiating an integration instance based at least in part on the integration template and associated with the client system at optional operation 1908. In some embodiments, the apparatus 200 receives a selection of the integration template inputted via the client system. In some embodiments, the client system communicates with the apparatus 200 to cause rendering of one or more user interfaces that enable selection of the integration template, for example as depicted and described with respect to FIGS. 12-14.

In some embodiments, the apparatus 200 initiates the integration instance by generating one or more data record(s), data object(s), and/or the like embodying the new integration instance. In some embodiments, the apparatus 200 associates the newly generated data with the client system (e.g., by storing such data associated with a user identifier, device identifier, and/or the like identifying the client system or a user thereof). Alternatively or additionally, in some embodiments, the apparatus 200 transmits the integration template to the client system, where the client system generates the new integration instance in response to receiving the integration template. For example, in some embodiments the client system retrieves and/or maintains the integration instances associated with a particular user, the client system, and/or the like. Upon initiation of the integration instance, the integration instance may subsequently be utilized to enable data communication between a monitoring system and at least one third-party device.

Figure 20:
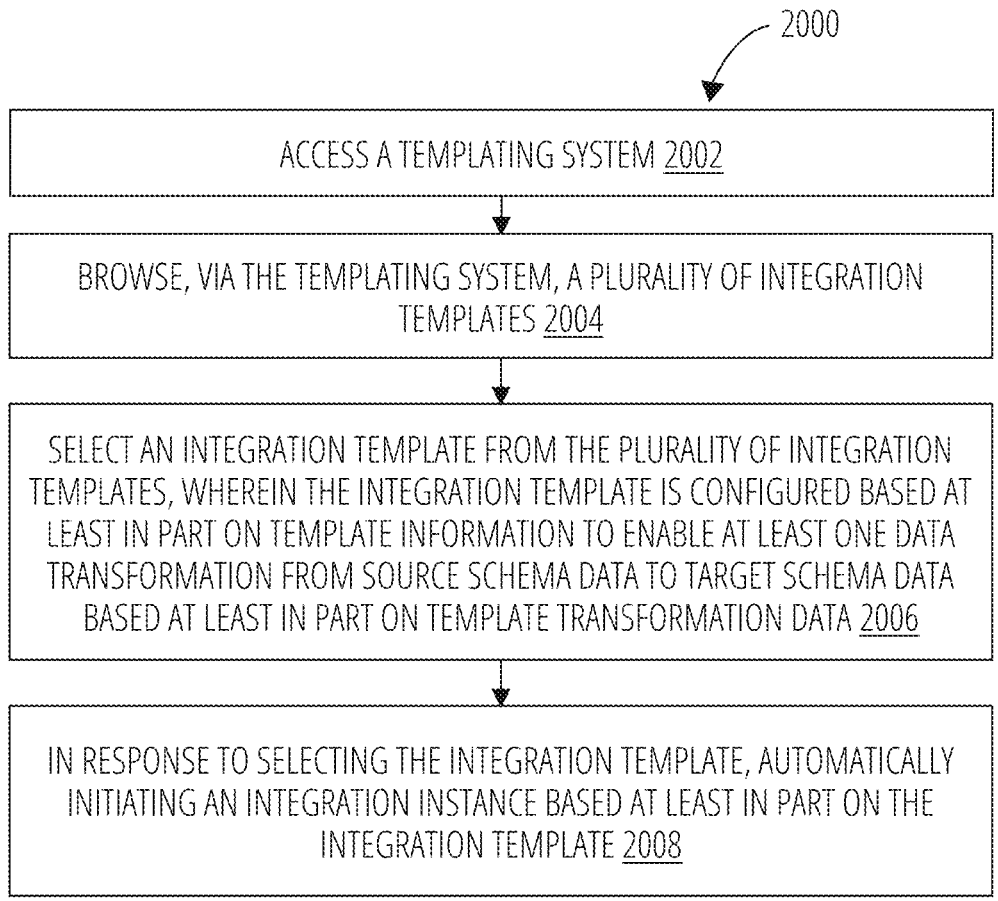
FIG. 20 illustrates a flowchart depicting example operations of another example process for initiating an integration instance based at least in part on an integration template from a second perspective, in accordance with at least one embodiment of the present disclosure.

FIG. 20 illustrates a flowchart depicting example operations of another example process for initiating an integration instance based at least in part on an integration template from a second perspective, in accordance with at least one embodiment of the present disclosure. Specifically, FIG. 20 depicts an example process 2000. In some embodiments, the process 2000 is embodied by computer program code stored on a non-transitory computer-readable storage medium of a computer program product configured for execution to perform the process as depicted and described. Alternatively or additionally, in some embodiments, the process 2000 is performed by one or more specially configured computing devices, such as the apparatus 300 alone or in communication with one or more other component(s), device(s), system(s), and/or the like. In this regard, in some such embodiments, the apparatus 300 is specially configured by computer-coded instructions (e.g., computer program instructions) stored thereon, for example in the memory 304 and/or another component depicted and/or described herein and/or otherwise accessible to the apparatus 300, for performing the operations as depicted and described. In some embodiments, the apparatus 300 is in communication with one or more external apparatus(es), system(s), device(s), and/or the like, to perform one or more of the operations as depicted and described. For example, the apparatus 300 in some embodiments is in communication with at least one external data repository, templating system, and/or the like, to perform one or more of the operation(s) as depicted and described. For purposes of simplifying the description, the process 2000 is described as performed by and from the perspective of the apparatus 300.

Although the example process 2000 depicts a particular sequence of operations, the sequence may be altered without departing from the scope of the present disclosure. For example, some of the operations depicted may be performed in parallel or in a different sequence that does not materially affect the function of the process 2000. In other examples, different components of an example device or system that implements the process 2000 may perform functions at substantially the same time or in a specific sequence.

According to some examples, the method includes accessing a templating system at operation 2002. In some embodiments, the templating system includes or is embodied by the apparatus 200. The apparatus 300 in some embodiments accesses templating system via one or more application programming interface(s), web endpoint(s), and/or the like. In some such embodiments the apparatus 300 establishes a connection with the templating system based at least in part on user credentials inputted or otherwise received by the user. In this regard, the user credentials may be transmitted to the templating system for authentication, and upon authentication will establish an authenticated session associated with a particular account corresponding to the user credentials. In some embodiments, the apparatus 300 having the established authenticated session embodies a client system associated with a particular user account or enterprise account, for example such that data corresponding to the client system embodies or includes data stored associated with the particular authenticated user account or enterprise account.

According to some examples, the method includes browsing, via the templating system, a plurality of integration templates at operation 2004. In some embodiments, the apparatus 300 transmits one or more request(s) to the templating system that causes the templating system to retrieve a plurality of integration templates returned to the apparatus 300. Additionally or alternatively, in some embodiments the templating system automatically retrieves the plurality of integration templates at the time that the connection with the templating system is established. In some embodiments, the apparatus 300 receives all integration templates maintained by the templating system. Alternatively or additionally, in some embodiments, the apparatus 300 receives the plurality of integration templates specifically available to the apparatus 300, for example integration templates stored associated with a particular user account or enterprise account for which an authenticated session is established with the apparatus 300. In this regard, for example, the templating system in some embodiments queries one or more data repositories based at least in part on one or more data identifier(s) uniquely representing the user account or enterprise account with which a connection is established.

According to some examples, the method includes selecting an integration template from the plurality of integration templates at operation 2006. The integration template is configured based at least in part on template information. For example, in some embodiments the integration template is configured based at least in part on template information including source schema data, target schema data, and template transformation data, where such data enables at least one data transformation from the source schema data to the target schema data based at least in part on the template transformation data. In some embodiments, a particular integration template is selected based at least in part on user input. For example, in some embodiments the apparatus 300 causes rendering of a specially configured user interface that depicts the plurality of integration templates retrieved, for example at operation 2004. In some such embodiments, the apparatus 300 may receive user input associated with a particular interface element, the interface element corresponding to a particular integration template to be selected based at least in part on the user input.

According to some examples, the method includes, in response to selecting the integration template, automatically initiating an integration instance based at least in part on the integration template at operation 2008. In some embodiments, the apparatus 300 receives the integration template from the templating system, and creates the integration instance based at least in part on the integration template. Additionally or alternatively, in some embodiments, the apparatus 300 transmits data indicating the selected integration template to the templating system, and the templating system generates the new integration instance based at least in part on the selected integration template. The templating system in some embodiments stores the new integration instance and stores the new integration instance associated with the client system embodied by the apparatus 300 (e.g., with a user account and/or enterprise account corresponding to the client system), and/or transmits the new integration instance to the apparatus 300 for use. In some other embodiments, the templating system and/or client system generates the new integration instance, and the apparatus 300 stores the new integration instance for subsequent use.

In some embodiments, the method further includes receiving, at a monitoring system and utilizing the new integration instance, monitored data. In some embodiments, the monitored data is collected, processed, and/or communicated from a third-party device via the integration instance. In some embodiments, the monitoring system receives the monitored data utilizing the integration instance embodied on a client system corresponding to the third-party device. In this regard, the integration instance may embody the mechanism by which the monitored data is collected, interpreted by one or more of the monitoring system or the third-party device, and/or the like.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for managing third-party integrations comprising:
   receiving, at a templating system, template information that includes at least source schema data, target schema data, and template transformation data defining at least one data transformation from the source schema data to the target schema data;
   generating, at the templating system, an integration template based at least in part on the template information;
   enabling a client system to access at least the integration template via the templating system; and
   in response to receiving a selection of the integration template at the templating system, initiating, at the client system, an integration instance based at least in part on the integration template.

2. The computer-implemented method of claim 1, wherein the templating system enables the client system to access a plurality of integration templates, wherein the integration template is selected from the plurality of integration templates.

3. The computer-implemented method of claim 1, further comprising:
   receiving an integration key via the client system; and
   initiating the integration instance based at least in part on the integration key.

4. The computer-implemented method of claim 1, further comprising:
   receiving, at the templating system, a filter rule set; and
   generating the integration template based at least in part on the filter rule set.

5. The computer-implemented method of claim 1, further comprising:
   receiving, at the templating system, a flow definitions set; and
   generating the integration template based at least in part on the flow definitions set.

6. The computer-implemented method of claim 1, further comprising:
   in response to a request from the client system, providing at least a portion of the template information associated with the integration template.

7. The computer-implemented method of claim 1, further comprising:
   providing the client system access to one of the source schema data or the target schema data, but not both.

8. The computer-implemented method of claim 1, further comprising:
   receiving updated information corresponding to an integration template; and
   in response to receiving the updated information corresponding to the integration template, automatically pushing the updated information to the integration instance associated with the integration template, wherein the integration instance is updated based at least in part on the updated information upon pushing the updated information.

9. The computer-implemented method of claim 1, further comprising:
   receiving updated information corresponding to an integration template; and
   in response to receiving the updated information corresponding to the integration template, automatically generating a notification to the client system indicating that the updated information is retrievable via the templating system, wherein the integration instance is updated based at least in part on the updated information upon pushing the updated information.

10. The computer-implemented method of claim 9, further comprising:
   in response to receiving an update request from the client system, automatically pushing the updated information to the integration instance associated with the integration template.

11. The computer-implemented method of claim 1, further comprising:
   causing rendering of a dashboard at the client system, the dashboard comprising at least one interface element representing a plurality of integration instances initiated associated with the client system.

12. The computer-implemented method of claim 11, the dashboard further comprising at least one additional interface element configured to activate the integration instance and/or deactivate the integration instance.

13. The computer-implemented method of claim 1, further comprising:
   causing rendering of a dashboard at the client system, the dashboard comprising at least one interface element representing an integration action log, wherein the integration action log indicates at least one change to the integration template corresponding to the integration instance.

14. An apparatus comprising at least one processor and at least one non-transitory memory having computer-coded instructions stored thereon that, in execution with the at least one processor, cause the apparatus to:
   receive template information that includes at least source schema data, target schema data, and template transformation data defining at least one data transformation from the source schema data to the target schema data;
   generate an integration template based at least in part on the template information;
   enable a client system to access at least the integration template via the templating system; and
   in response to receiving a selection of the integration template at the templating system, initiate, at the client system, an integration instance based at least in part on the integration template.

15. The apparatus according to claim 14, wherein the apparatus enables the client system to access a plurality of integration templates, wherein the integration template is selected from the plurality of integration templates.

16. The apparatus according to claim 14, further caused to:
   provide the client system access to one of the source schema data or the target schema data, but not both.

17. The apparatus according to claim 14, further caused to:
   receive updated information corresponding to an integration template; and
   in response to receiving the updated information corresponding to the integration template, automatically generate a notification to the client system indicating that the updated information is retrievable via the templating system, wherein the integration instance is updated based at least in part on the updated information upon pushing the updated information.

18. The apparatus according to claim 14, further caused to:
   cause rendering of a dashboard at the client system, the dashboard comprising at least one interface element representing an integration action log, wherein the integration action log indicates at least one change to the integration template corresponding to the integration instance.

19. A computer program product comprising at least one non-transitory computer-readable storage medium having computer program code stored thereon that, in execution with at least one processor, is configured to:

receive, at a templating system, template information that includes at least source schema data, target schema data, and template transformation data defining at least one data transformation from the source schema data to the target schema data;

generate, at the templating system, an integration template based at least in part on the template information;

enable a client system to access at least the integration template via the templating system; and in response to receiving a selection of the integration template at the templating system, initiate, at the client system, an integration instance based at least in part on the integration template.

* * * * *